US011113022B2

(12) United States Patent
Wachter et al.

(10) Patent No.: US 11,113,022 B2
(45) Date of Patent: Sep. 7, 2021

(54) METHOD, SYSTEM AND INTERFACE FOR CONTROLLING A SUBWOOFER IN A NETWORKED AUDIO SYSTEM

(71) Applicant: D&M Holdings, Inc., Kanagawa (JP)

(72) Inventors: Martin Richard Wachter, Phoenix, MD (US); Ryouichi Yamanouchi, Kanagawa (JP); Samuel Baxter, North Sydney (AU); Nicholas Murrells, San Diego, CA (US); Brendon Stead, Carlsbad, CA (US)

(73) Assignee: D&M Holdings, Inc., Kanagawa (JP)

( * ) Notice: Subject to any disclaimer, the term of this patent is extended or adjusted under 35 U.S.C. 154(b) by 557 days.

(21) Appl. No.: 15/153,098

(22) Filed: May 12, 2016

(65) Prior Publication Data
US 2016/0335041 A1    Nov. 17, 2016

Related U.S. Application Data

(63) Continuation-in-part of application No. 14/842,877, filed on Sep. 2, 2015.
(Continued)

(51) Int. Cl.
*G06F 3/048* (2013.01)
*G06F 3/16* (2006.01)
(Continued)

(52) U.S. Cl.
CPC ............ *G06F 3/162* (2013.01); *G06F 3/0486* (2013.01); *G06F 3/0488* (2013.01);
(Continued)

(58) Field of Classification Search
CPC ..... H04W 84/12; H04W 48/16; H04W 84/18; H04W 4/06; G06F 3/04842; G06F 3/0488;
(Continued)

(56) References Cited

U.S. PATENT DOCUMENTS 5,838,384 A     11/1998  Schindler et al.
6,359,656 B1 *   3/2002  Huckins ............... H04N 5/04
                                                    348/423.1
(Continued)

FOREIGN PATENT DOCUMENTS

WO     2014074089     5/2014
WO     2014/094877    6/2014

OTHER PUBLICATIONS

Goo Jun, Home Media Center and Media Clients for Multi-room audio and video applications, Jan. 1, 2005, IEEE Conference Paper, pp. 257-260 (Year: 2005).*
(Continued)

*Primary Examiner* — Steven B Theriault
(74) *Attorney, Agent, or Firm* — Peter A. Nieves; Sheehan Phinney Bass & Green PA

(57) ABSTRACT

A method for controlling a plurality of media rendering devices in a data network with a controller device in communication with the network is disclosed. A network enabled subwoofer is added to the data network such that the subwoofer is visible on the network to a controller. The controller user interface displays a subwoofer graphical object and a group graphical object representing a group of one or more rendering devices. A user selects the group graphical object via the controller user interface, and the subwoofer is joined with the selected group. An audio channel associated with the group is assigned to the subwoofer. The controller user interface hides the subwoofer graphical object.

12 Claims, 18 Drawing Sheets

Related U.S. Application Data

(60) Provisional application No. 62/160,204, filed on May 12, 2015.

(51) Int. Cl.
*G06F 3/0484* (2013.01)
*G06F 3/0488* (2013.01)
*G06F 3/0486* (2013.01)
*H04R 27/00* (2006.01)
*G11B 27/34* (2006.01)
*H04R 3/12* (2006.01)

(52) U.S. Cl.
CPC .......... *G06F 3/04842* (2013.01); *G06F 3/165* (2013.01); *G11B 27/34* (2013.01); *H04R 27/00* (2013.01); *H04R 3/12* (2013.01); *H04R 2227/005* (2013.01)

(58) Field of Classification Search
CPC .... G06F 3/165; G06F 3/0482; G06F 3/04817; G06F 3/04883; G06F 13/385; G06F 2203/0384; G06F 3/038; G06F 3/16; G06F 9/4881; G06F 9/5055; G06F 3/0481; G06F 3/162; G06F 3/0486; G06F 16/639; G06F 3/04847; G06F 16/64; G06F 16/44; G06F 2203/04803; G06F 3/0484; G06F 16/635; G06F 16/4393; G06F 3/0485; G06F 16/335; G06F 16/60; G06F 16/738; G06F 3/04855; G06F 3/167; H04R 27/00; H04R 3/12; H04R 2227/005; G11B 27/34
See application file for complete search history.

(56) References Cited

U.S. PATENT DOCUMENTS

| | | | |
|---|---|---|---|
| 6,560,707 B2 | 5/2003 | Curtis et al. | |
| 6,650,963 B2* | 11/2003 | DiLorenzo | H04H 20/63 348/E7.071 |
| 6,934,740 B1 | 8/2005 | Lawande et al. | |
| 6,976,082 B1* | 12/2005 | Ostermann | H04L 29/06027 704/260 |
| 7,130,608 B2* | 10/2006 | Hollstrom | H04M 1/72522 455/403 |
| 7,130,616 B2* | 10/2006 | Janik | H04L 12/2898 455/412.1 |
| 7,149,549 B1 | 12/2006 | Ortiz et al. | |
| 7,313,540 B1 | 12/2007 | Hueller | |
| 7,337,409 B2 | 2/2008 | Doblmayr et al. | |
| 7,373,414 B2* | 5/2008 | Evron | G06F 17/30017 345/1.3 |
| 7,412,060 B2 | 8/2008 | Fukuda | |
| 7,571,014 B1* | 8/2009 | Lambourne | H04R 27/00 700/94 |
| 7,574,691 B2 | 8/2009 | Freitas et al. | |
| 7,630,501 B2* | 12/2009 | Blank | H04S 7/301 381/300 |
| 7,689,510 B2* | 3/2010 | Lamkin | G06F 17/30041 705/51 |
| 7,791,594 B2 | 9/2010 | Dunko | |
| 7,792,311 B1* | 9/2010 | Holmgren | H04S 7/308 381/17 |
| 7,978,176 B2 | 7/2011 | Forstall | |
| 8,024,055 B1 | 9/2011 | Holmgren | H03F 3/183 700/94 |
| 8,111,132 B2 | 2/2012 | Allen et al. | |
| 8,116,476 B2 | 2/2012 | Inohara | |
| 8,131,389 B1 | 3/2012 | Hardwick et al. | |
| 8,214,447 B2 | 7/2012 | Deslippe et al. | |
| 8,239,910 B2* | 8/2012 | Anderson, Jr. | H04S 1/002 348/157 |
| 8,243,949 B2 | 8/2012 | Bhow et al. | |
| 8,245,143 B2 | 8/2012 | Yach et al. | |
| 8,290,172 B2 | 10/2012 | Langella | |
| 8,290,603 B1* | 10/2012 | Lambourne | G06F 3/04855 700/94 |
| 8,368,723 B1 | 2/2013 | Gossweiler, II et al. | |
| 8,724,600 B2 | 5/2014 | Ramsey | |
| 8,762,870 B2* | 6/2014 | Robotham | G06F 3/0486 715/769 |
| 8,788,080 B1* | 7/2014 | Kallai | H04R 27/00 700/94 |
| 8,812,051 B2 | 8/2014 | Jouin | |
| 8,832,823 B2 | 9/2014 | Boss | |
| 8,887,071 B2 | 11/2014 | Yang | |
| 9,001,047 B2 | 4/2015 | Forstall | |
| 9,239,662 B2 | 1/2016 | Matas et al. | |
| 9,288,596 B2* | 3/2016 | Gossain | G11B 27/002 |
| 9,342,234 B2 | 5/2016 | Kobayashi et al. | |
| 9,395,871 B2* | 7/2016 | Marra | G06F 3/04847 |
| 9,504,076 B2 | 11/2016 | El-Hoiydi | |
| 9,640,158 B1 | 5/2017 | Baker | |
| 9,654,073 B2* | 5/2017 | Apodaca | H03G 3/02 |
| 9,671,997 B2* | 6/2017 | Triplett | G06F 3/165 |
| 9,703,471 B2* | 7/2017 | Wachter | G06F 3/14 |
| 9,999,091 B2* | 6/2018 | Wachter | H04W 76/10 |
| 10,051,103 B1 | 8/2018 | Gordon et al. | |
| 10,055,108 B2* | 8/2018 | Bates | G06F 3/165 |
| 2002/0003548 A1* | 1/2002 | Krusche | G06F 3/0481 715/736 |
| 2002/0013852 A1* | 1/2002 | Janik | H04L 12/2861 709/231 |
| 2002/0055788 A1 | 5/2002 | Petrie et al. | |
| 2002/0101997 A1 | 8/2002 | Curtis et al. | |
| 2002/0133327 A1* | 9/2002 | McGrath | H04R 5/04 703/21 |
| 2002/0170061 A1 | 11/2002 | DiLorenzo | |
| 2003/0020763 A1* | 1/2003 | Mayer, III | H04L 12/2803 715/838 |
| 2003/0029918 A1* | 2/2003 | Leanheart | G09F 27/00 235/462.13 |
| 2003/0161292 A1* | 8/2003 | Silvester | H04W 76/15 370/349 |
| 2003/0208300 A1 | 11/2003 | DiLorenzo | |
| 2004/0162025 A1* | 8/2004 | Plummer | H04R 5/02 455/41.2 |
| 2005/0094610 A1* | 5/2005 | de Clerq | G05B 15/02 370/338 |
| 2005/0111672 A1 | 5/2005 | Chen | |
| 2005/0195986 A1* | 9/2005 | McCarty | H04R 5/02 381/79 |
| 2005/0220309 A1* | 10/2005 | Hirata | H04S 7/302 381/18 |
| 2005/0262201 A1* | 11/2005 | Rudolph | H04L 12/1827 709/205 |
| 2006/0251260 A1* | 11/2006 | Kitayama | H04S 7/302 381/1 |
| 2006/0258419 A1 | 11/2006 | Winkler | |
| 2006/0281477 A1* | 12/2006 | Downes | H04L 12/2809 455/509 |
| 2007/0014403 A1* | 1/2007 | Loo | H04N 21/4126 380/201 |
| 2007/0022207 A1* | 1/2007 | Millington | H04L 65/80 709/231 |
| 2007/0157173 A1* | 7/2007 | Klein | G06F 8/71 717/122 |
| 2007/0162953 A1 | 7/2007 | Bolliger et al. | |
| 2007/0223398 A1* | 9/2007 | Luo | H04W 4/08 370/254 |
| 2007/0297459 A1* | 12/2007 | Cucos | H04J 3/07 370/505 |
| 2008/0010648 A1 | 1/2008 | Ando et al. | |
| 2008/0092204 A1 | 4/2008 | Bryce et al. | |
| 2008/0103913 A1* | 5/2008 | Leach | G06Q 30/0631 705/26.7 |
| 2008/0215959 A1 | 9/2008 | Lection | |
| 2008/0222295 A1* | 9/2008 | Robinson | G06F 17/30867 709/227 |

(56) References Cited

U.S. PATENT DOCUMENTS

| | | | |
|---|---|---|---|
| 2008/0256466 A1* | 10/2008 | Salvador | G06T 13/80 715/762 |
| 2008/0271080 A1 | 10/2008 | Gossweiler | |
| 2008/0313568 A1 | 12/2008 | Park et al. | |
| 2009/0002335 A1 | 1/2009 | Chaudhri | |
| 2009/0094317 A1* | 4/2009 | Venkitaraman | H04L 29/12311 709/203 |
| 2009/0164880 A1* | 6/2009 | Lection | G06F 3/0481 715/212 |
| 2009/0169030 A1* | 7/2009 | Inohara | H04S 3/00 381/80 |
| 2009/0171487 A1* | 7/2009 | Wilhelm | G11B 27/10 700/94 |
| 2009/0172542 A1* | 7/2009 | Girish | G06F 1/1616 715/716 |
| 2009/0187842 A1 | 7/2009 | Collins et al. | |
| 2009/0228919 A1* | 9/2009 | Zott | H04N 7/17318 725/34 |
| 2009/0258598 A1* | 10/2009 | Shin | H04B 1/202 455/41.3 |
| 2010/0058188 A1* | 3/2010 | Shah | G06F 9/44505 715/734 |
| 2010/0088590 A1 | 4/2010 | Bajohr | |
| 2010/0088639 A1 | 4/2010 | Yach et al. | |
| 2010/0121919 A1 | 5/2010 | Hepworth et al. | |
| 2010/0131869 A1 | 5/2010 | Adachi | |
| 2010/0138782 A1 | 6/2010 | Rainisto | |
| 2010/0216515 A1 | 8/2010 | White et al. | |
| 2010/0240390 A1 | 9/2010 | Russ | |
| 2010/0259547 A1 | 10/2010 | De Aguiar | |
| 2010/0260348 A1 | 10/2010 | Bhow et al. | |
| 2010/0262489 A1 | 10/2010 | Salinas | |
| 2010/0272270 A1* | 10/2010 | Chaikin | H04R 29/001 381/59 |
| 2010/0284389 A1* | 11/2010 | Ramsay | G06F 17/30017 370/338 |
| 2010/0299639 A1* | 11/2010 | Ramsay | H04R 27/00 715/835 |
| 2010/0318917 A1* | 12/2010 | Holladay | H04N 21/43615 715/735 |
| 2010/0325211 A1 | 12/2010 | Ylinen et al. | |
| 2011/0004517 A1 | 1/2011 | Soto | |
| 2011/0028083 A1* | 2/2011 | Soitis | G11B 27/10 455/3.06 |
| 2011/0211219 A1 | 9/2011 | Bradley et al. | |
| 2012/0032981 A1 | 2/2012 | Hackwell | |
| 2012/0051560 A1* | 3/2012 | Sanders | H03G 1/02 381/105 |
| 2012/0054143 A1 | 3/2012 | Doig | |
| 2012/0057725 A1* | 3/2012 | Nakamura | H04S 7/40 381/104 |
| 2012/0072853 A1 | 3/2012 | Krigstrom | |
| 2012/0084712 A1 | 4/2012 | Gimpl | |
| 2012/0099594 A1* | 4/2012 | Lau | H04L 12/2807 370/392 |
| 2012/0113224 A1* | 5/2012 | Nguyen | G06T 7/55 348/46 |
| 2012/0117598 A1* | 5/2012 | Pons | H04N 5/76 725/40 |
| 2012/0121105 A1* | 5/2012 | Holladay | H04N 21/43615 381/81 |
| 2012/0190386 A1 | 7/2012 | Anderson | |
| 2012/0192070 A1 | 7/2012 | De Faria et al. | |
| 2012/0240055 A1 | 9/2012 | Webber | |
| 2012/0263318 A1* | 10/2012 | Millington | H04R 3/12 381/107 |
| 2012/0269361 A1* | 10/2012 | Bhow | H04N 21/4108 381/81 |
| 2012/0290965 A1 | 11/2012 | Ignor | |
| 2012/0310703 A1* | 12/2012 | Cavalcanti | G06Q 30/0201 705/7.29 |
| 2013/0022221 A1* | 1/2013 | Kallai | G06F 3/165 381/300 |
| 2013/0076651 A1* | 3/2013 | Reimann | G06F 3/0486 345/173 |
| 2013/0080955 A1* | 3/2013 | Reimann | G06F 3/0486 715/769 |
| 2013/0080966 A1 | 3/2013 | Kikin-Gil et al. | |
| 2013/0089026 A1 | 4/2013 | Piper et al. | |
| 2013/0094667 A1* | 4/2013 | Millington | G06F 3/165 381/104 |
| 2013/0109928 A1 | 5/2013 | Menzel et al. | |
| 2013/0154950 A1 | 6/2013 | Kvasnica | |
| 2013/0159928 A1 | 6/2013 | Joynes | |
| 2013/0173794 A1 | 7/2013 | Agerbak et al. | |
| 2013/0187861 A1 | 7/2013 | Lavallee | |
| 2013/0231044 A1* | 9/2013 | Wang | H04H 20/72 455/3.06 |
| 2013/0238724 A1 | 9/2013 | Cunningham | |
| 2013/0246916 A1* | 9/2013 | Reimann | H04N 21/8113 715/716 |
| 2013/0275901 A1* | 10/2013 | Saas | G06F 3/0486 715/769 |
| 2013/0290888 A1* | 10/2013 | Reimann | G06F 3/0486 715/769 |
| 2013/0305152 A1* | 11/2013 | Griffiths | G06F 3/04883 715/716 |
| 2013/0311912 A1* | 11/2013 | Aso | G06F 3/04817 715/762 |
| 2013/0334300 A1 | 12/2013 | Evans | |
| 2013/0340003 A1 | 12/2013 | Davis et al. | |
| 2014/0003625 A1* | 1/2014 | Sheen | H03G 3/20 381/103 |
| 2014/0009676 A1* | 1/2014 | Cannistraro | G08C 17/00 348/460 |
| 2014/0022285 A1 | 1/2014 | Stovicek et al. | |
| 2014/0026088 A1 | 1/2014 | Monte | |
| 2014/0040803 A1* | 2/2014 | Briand | G06F 3/0486 715/769 |
| 2014/0047487 A1* | 2/2014 | Guedalia | H04W 4/70 725/80 |
| 2014/0057569 A1* | 2/2014 | Toivanen | H04M 1/7253 455/41.3 |
| 2014/0064492 A1* | 3/2014 | Lakkundi | G06F 3/165 381/17 |
| 2014/0068475 A1 | 3/2014 | Li et al. | |
| 2014/0072270 A1 | 3/2014 | Goldberg et al. | |
| 2014/0078178 A1 | 3/2014 | Li | |
| 2014/0089832 A1 | 3/2014 | Kim et al. | |
| 2014/0094943 A1* | 4/2014 | Bates | H04N 21/00 700/94 |
| 2014/0154983 A1 | 6/2014 | Schultz et al. | |
| 2014/0169569 A1* | 6/2014 | Toivanen | H04R 5/04 381/17 |
| 2014/0181654 A1* | 6/2014 | Kumar | H04N 21/4126 715/716 |
| 2014/0193047 A1 | 7/2014 | Grosz | |
| 2014/0195921 A1 | 7/2014 | Grosz et al. | |
| 2014/0195953 A1 | 7/2014 | Sakai et al. | |
| 2014/0201635 A1* | 7/2014 | Kumar | H04N 21/4325 715/716 |
| 2014/0213372 A1 | 7/2014 | Liang | |
| 2014/0219483 A1* | 8/2014 | Hong | H04S 7/301 381/307 |
| 2014/0229959 A1* | 8/2014 | Beckhardt | H04N 21/65 725/5 |
| 2014/0242913 A1* | 8/2014 | Pang | H04L 67/025 455/41.3 |
| 2014/0270235 A1* | 9/2014 | Shin | H04R 27/00 381/77 |
| 2014/0270306 A1* | 9/2014 | Luna | H04R 3/00 381/334 |
| 2014/0274185 A1* | 9/2014 | Luna | H04W 24/08 455/517 |
| 2014/0279889 A1* | 9/2014 | Luna | G06F 16/27 707/626 |
| 2014/0283136 A1 | 9/2014 | Dougherty et al. | |
| 2014/0289597 A1 | 9/2014 | Kim | |
| 2014/0310597 A1* | 10/2014 | Triplett | G06F 3/04883 715/716 |

(56) References Cited

U.S. PATENT DOCUMENTS

| | | | |
|---|---|---|---|
| 2014/0334644 A1 | 11/2014 | Selig et al. | |
| 2014/0349596 A1 | 11/2014 | Saji et al. | |
| 2014/0355389 A1* | 12/2014 | Reunamaki | G08C 23/02 367/197 |
| 2014/0370817 A1* | 12/2014 | Luna | H04W 8/005 455/41.3 |
| 2014/0380159 A1* | 12/2014 | Reilly | G06F 3/017 715/716 |
| 2015/0022558 A1 | 1/2015 | Li | |
| 2015/0025661 A1* | 1/2015 | Vega-Zayas | H04N 21/26258 700/94 |
| 2015/0086045 A1* | 3/2015 | Millington | G11B 27/10 381/123 |
| 2015/0091708 A1* | 4/2015 | Tan | G08C 17/02 340/12.5 |
| 2015/0094120 A1 | 4/2015 | Suh | |
| 2015/0161141 A1 | 6/2015 | Evan | |
| 2015/0181010 A1 | 6/2015 | Bran | |
| 2015/0192940 A1* | 7/2015 | Silva | H04L 12/2809 700/276 |
| 2015/0193135 A1 | 7/2015 | Kim et al. | |
| 2015/0195649 A1 | 7/2015 | Vogt | |
| 2015/0256957 A1* | 9/2015 | Kim | H04R 3/12 381/303 |
| 2015/0262396 A1 | 9/2015 | Devarajan | |
| 2015/0286360 A1* | 10/2015 | Wachter | G06F 3/0482 345/173 |
| 2015/0293655 A1* | 10/2015 | Tan | H04S 1/005 715/727 |
| 2016/0026371 A1 | 1/2016 | Lu et al. | |
| 2016/0026428 A1* | 1/2016 | Morganstern | H04L 67/10 700/94 |
| 2016/0103586 A1 | 4/2016 | Greenberg | |
| 2016/0117072 A1 | 4/2016 | Sharifi | |
| 2016/0142635 A1 | 5/2016 | Kaneko et al. | |
| 2016/0162127 A1 | 6/2016 | Sepulveda et al. | |
| 2016/0309269 A1* | 10/2016 | Peters | H04N 21/44209 |
| 2016/0328789 A1 | 11/2016 | Grosz et al. | |
| 2016/0335041 A1 | 11/2016 | Wachter et al. | |
| 2016/0368547 A1 | 12/2016 | Franceschini et al. | |
| 2017/0060374 A1* | 3/2017 | Murrells | G06F 3/0482 |
| 2017/0272860 A1* | 9/2017 | Jeanne | H04R 3/12 |
| 2017/0300289 A1* | 10/2017 | Gattis | G10L 19/018 |
| 2017/0351900 A1 | 12/2017 | Lee et al. | |
| 2017/0357477 A1* | 12/2017 | Im | H04W 4/80 |
| 2018/0032997 A1 | 2/2018 | Gordon | |
| 2018/0063665 A1* | 3/2018 | Walker | G06F 3/0482 |
| 2018/0136898 A1* | 5/2018 | Shi | G06F 3/048 |
| 2018/0255398 A1* | 9/2018 | Fischer | H04R 3/12 |
| 2019/0163339 A1 | 5/2019 | Zhu | |
| 2020/0242298 A1 | 7/2020 | Allen et al. | |

OTHER PUBLICATIONS

Taewan Kim et al., A Hardware Framework for Smart Speaker Control of Home Audio Network, Nov. 2010, IEEE Transactions on Consumer Electronics, vol. 56, No. 4, pp. 2506-2510 (Year: 2010).*
International Search Report for PCT/US16/31964 dated Aug. 18, 2016.
International Search Report and Written Opinion for PCT/US16/32092 dated Oct. 14, 2016.
International Search Report and Written Opinion for PCT/US16/49425 dated Oct. 28, 2016.
Cheng, et al, IrotateGrasp: automatic screen rotation based on grasp of mobile devices. Proceedings of the SIGCHI conference on Human Factors in computing Systems; 3051-3054; 2013.
Kim et al; Huffman user interface for fill touch screen based mobile phones. Proceedings of the 12th International Conference on Advanced Communication Technology; 1021-1026; 2010.
European Search Report for EP16793488.4 dated Sep. 4, 2018.
European Search Report for EP16793522.0 dated Sep. 4, 2018.

* cited by examiner

METHOD, SYSTEM AND INTERFACE FOR CONTROLLING A SUBWOOFER IN A NETWORKED AUDIO SYSTEM

CROSS-REFERENCE TO RELATED APPLICATIONS

This application claims the benefit of U.S. Provisional Patent Application Ser. No. 62/160,204, filed May 12, 2015, entitled "Method for Negotiating Group Membership for Audio Controllers," which is incorporated by reference herein in its entirety, and is a continuation-in-part of copending of U.S. patent application Ser. No. 14/842,877, filed Sep. 2, 2015, entitled "Combined Tablet Screen Drag-and-drop Interface," which is incorporated by reference herein in its entirety.

FIELD OF THE INVENTION

The present invention relates to media rendering devices, and more particularly, is related to a user interface for controlling a media rendering device. In particular, the present invention provides an interface that utilizes networked audio controllers to add one or more subwoofers to an audio system, and subsequently join the one or more subwoofers with one or more speakers within the audio system for enhanced sound and easy control of the audio output through the networked audio controllers.

BACKGROUND OF THE INVENTION

Single and multi-room audio systems, which provide the capability to stream music throughout a given space within a home or other structures are in high demand. In addition, it has become commonplace for an individual to have access to one or more devices that render media, such as an mp3 player, a car stereo, a home entertainment system, a portable computer or tablet, a gaming console, and a smart phone, among others. The rendering devices may have access to a communication network and/or the internet, and may be configured to render digital media provided over the communication network and/or the internet, for example, a digital media streaming service.

For example, audio players can be situated in distinct regions of the home or other structure to provide playback in such distinct regions. Each of the audio players can have its own amplifier(s) and one or more speakers, which are typically installed in one place. For instance, one audio player system can be situated in a living room, while another is in a bedroom. Thus, separate regions/zones of the home can have separate audio players to play back from the same or different audio sources. To play back an audio source, the audio source is provided locally at each audio player, such as via the Internet, local network server, attached storage, external analog audio input, a compact disc or a radio broadcast, etc. Thus, each room can provide the same or different audio content by separately controlling the separate audio player systems. In some examples, a single audio player system can include hardwired speakers in multiple rooms so as to create a unified audio environment in otherwise acoustically separated rooms. For example, ceiling mounted speakers may be provided throughout a home to play audio content from a single source of audio content. In addition, where improved sound quality is desired, one or more subwoofers can be used in combination with the speakers. Subwoofers exclusively reproduce the lowest register of audio frequencies known as bass. Thus, they are used in combination with other speakers covering higher frequencies to add impact and depth to the sound. In general, subwoofers are not used alone, only in concert with another non-subwoofer transducer.

With such systems, it is important to provide a user with easy access to all the music and sound that they want to listen to, in any desired location of the home or other structure. In response, platform based applications hosted by portable controller devices, such as a smart phone or tablet, have been designed to control one or more media rendering devices using wireless networks. However, controlling multiple media rendering devices with a single controller device may be confusing and/or cumbersome. Further, configuration of devices being added to a wireless network may be cumbersome.

For example, FIG. 1 shows a series of screen shots of a controller screen of a controller configured to control a media rendering device. The controller may be an application (or "app") running on a handheld computing device, such as a smart phone or tablet computer. The screens shown in FIG. 1 are oriented in portrait mode. Each of the screens includes three tabs at the bottom, labeled "Rooms," "Music," and "Now Playing." Selecting a tab results in the screen displaying the top level or last used menu for the selected tab. In FIG. 1, the first column displays the Rooms tab, the second column displays the Music tab, and the third column displays the Now Playing tab. The top row shows the top level menu for each tab, and the bottom row displays a secondary menu for the tab (if any).

As shown in the first column of FIG. 1, the Rooms tab allows the user to select one of two or more rooms with a media rendering device located therein. By selecting a room, such as "Living Room," "Kitchen," "Deck," "Guest Room," or "Bedroom," the controller can be used to select the media rendering device within that room to control, and the other tabs may display information pertaining to the rendering device in the selected room when selected.

As shown in the second column of FIG. 1, the Music Tab top level menu displays a list of music sources. For example, a music source may be a streaming source, such as "Pandora" or "Spotify," a radio station, or a local playlist, among other sources. Selecting a music source displays a playlist of tracks associated with the music source in the "Track Level Browse" screen. The playlist supplants the music source list in the Music Tab.

As shown in the third column of FIG. 1, the Now Playing Tab top level menu displays information regarding the track (media file) currently being rendered. For example, the screen may display a graphic associated with the track, such as an album cover or photograph of the recording artist, and information regarding the track, such as the title, collection, duration, or other information. Transport controls, such as play/pause, forward and reverse, as well as volume level may also be displayed. The current play queue may be displayed, for example, by swiping downward on the now playing screen or selecting an icon button. The play queue lists upcoming tracks in the order they are scheduled to be played (rendered).

While the above described user interface provides access to many functions, it may not be simple or intuitive to coordinate activities/functions among the various screens. Further, such systems and methods do not provide for incorporation, joining and control of one or more subwoofers with one or more media rendering devices. Therefore, there is a need in the industry to address one or more of the abovementioned shortcomings.

SUMMARY OF THE INVENTION

Embodiments of the present invention provide method, system and interface for controlling a subwoofer in a networked audio system. Briefly described, the present invention is directed to a method for controlling a plurality of media rendering devices in a data network with a controller device in communication with the network. A network enabled subwoofer is added to the data network such that the subwoofer is visible on the network to a controller. The controller user interface displays a subwoofer graphical object and a group graphical object representing a group of one or more rendering devices. A user selects the group graphical object via the controller user interface, and the subwoofer is joined with the selected group. An audio channel associated with the group is assigned to the subwoofer. The controller user interface hides the subwoofer graphical object.

Another aspect of the present invention is directed to a media rendering system with a media rendering device and a controller device in communication via a network. The controller has a touch screen with a display portion on which a graphical user interface (GUI) is provided displaying a list of a plurality of rooms, each of the plurality of rooms having a media rendering device therein. A drag-and-drop functionality is provided for joining a subwoofer with a media rendering device, wherein the subwoofer is displayed on the touch screen display portion of a controller, and wherein the subwoofer can be selected and dragged inside a selected room, causing the subwoofer to join with the media rendering device in the selected room.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principals of the invention.

DETAILED DESCRIPTION

Figure 1:
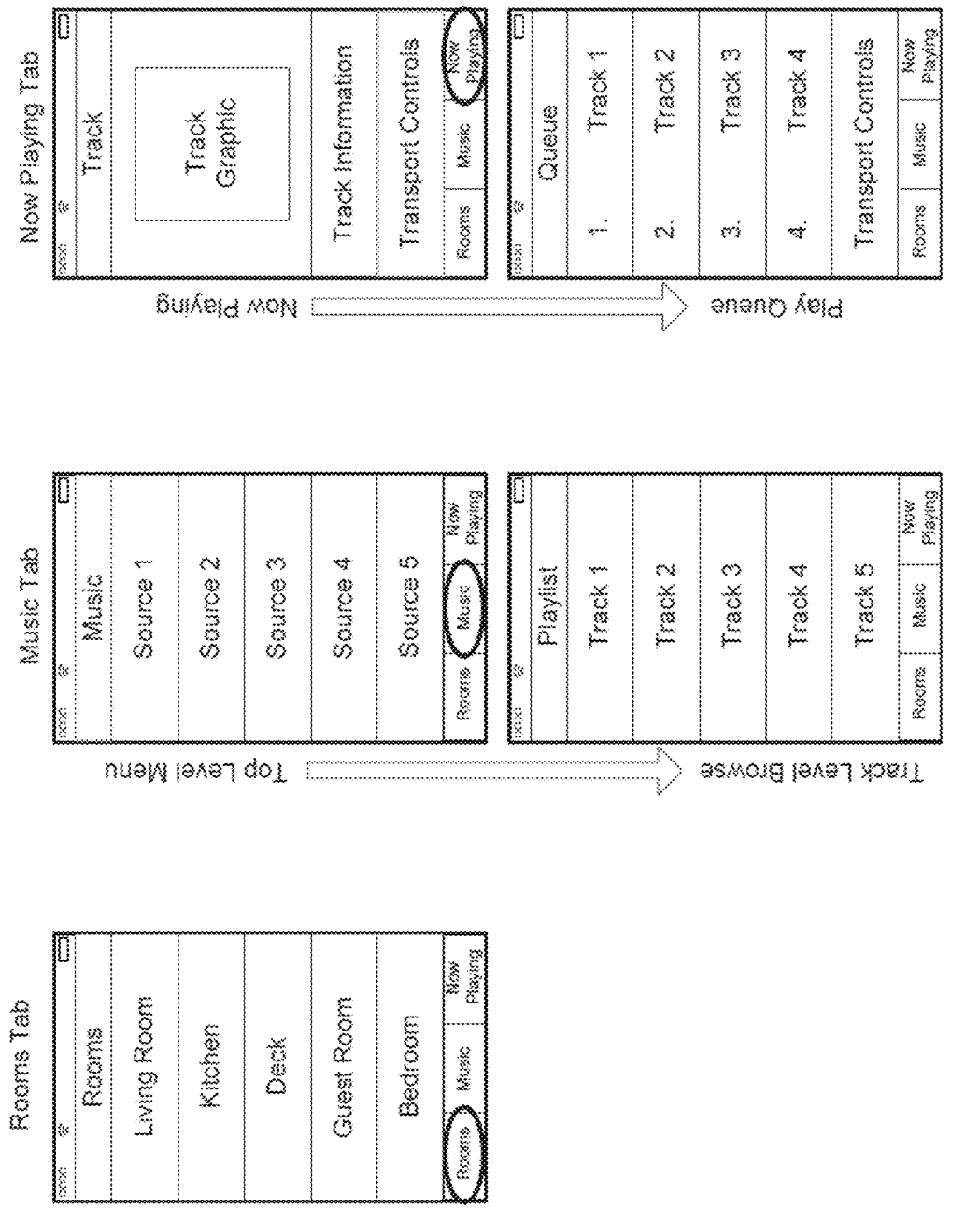
FIG. 1 is a schematic diagram of screenshots of a prior art controller for a media rendering system.

The following definitions are useful for interpreting terms applied to features of the embodiments disclosed herein, and are meant only to define elements within the disclosure.

As used within this disclosure, a "network" and/or "data network" refers to a communications network configured to exchange binary formatted information between two or more addressable networked devices via one or more data routers implementing a data routing protocol, for example, an IP network. For example, a data network may be distinguished from a short distance wireless network such as a Bluetooth or RF network, or a half or full duplex infrared (IR) and/or radio frequency (RF) communication link between two devices, for example, a remote control and an audio receiver.

As used within this disclosure, "network credentials" may refer to, but is not limited to, the type of network protocol, the network name for example an SSID (Service Set Identifier), the type of security used by that network (WEP, WPA, etc.), and a password for that network.

As used within this disclosure, a "player" refers to an exemplary audio device, for example, a powered speaker, preamp, amplifier, receiver, etc. The term player is not intended to convey that the audio device is capable, on its own, of rendering an audio signal or audio source.

As used within this disclosure, "media" refers to audio and/or video content either stored on a storage medium, such as a disk drive or digital disk, or streamed from a media server. Media may refer to analog and/or digitally formatted data. A specific recorded performance is referred to as a media program.

As used within this disclosure, an originating provider of media, either streamed or locally stored, is referred to as a "media source." Examples of a media source include a music and/or video server, an internet radio station, a streaming service, or a cache of media files.

As used within this disclosure, "rendering" refers to playback of a media program by a media player, also referred to herein as a "rendering device." Examples of rendering devices include, but are not limited to, an mp3 player, a tablet computer, a portable stereo, a home entertainment system, a portable video player, a smart phone, a laptop or desktop computer, and a mobile entertainment system. A rendering device generally has at least one audio transducer (speaker) used to render the media audio portion.

As used within this disclosure, a "controller" refers to a hand held device or an application running on a hand held device configured to interact with a media rendering device, and/or with one or more groups of media rendering devices, where each of one or more groups is configured to render the same or different media programs. The controller may interact with the media rendering device by issuing commands to adjust one or more operating parameters on the media rendering device, and/or to display operational status of the media rendering device. Examples of a hand held device include a smart phone or tablet computer.

As used within this disclosure, a "group" generally refers to a collection of one or more media rendering devices that are configured to collectively render a single channel or multi-channel media program, for example, a stereo pair, a stereo pair with subwoofer (2.1), a surround system including front, rear, center, and subwoofer speakers (5.1, 7.1, 7.2), among other collections. Each device in the group may be configured to render one or more channels of the media program.

As used within this disclosure "joining" generally refers to associating a media rendering device with a group. A group with two members may be referred to herein as a "pair", and "pairing" indicates joining a first audio device to a second audio device to form the pair. In particular, as used herein joining and/or pairing refers to a logical association via a data network, as distinguished from an electrical connection, for example, via audio and/or speaker cables.

As used within this disclosure, a "subwoofer" generally refers to an audio device configured to render a specific portion of audio bandwidth, typically frequencies below a specified ceiling (a "crossover frequency"). A subwoofer may be configured to render a received audio channel, or may be configured to derive its own channel from one or more received audio channels, for example, to derive a low frequency audio channel from left and right channels of a stereo audio signal. A subwoofer may be paired or joined with one or more speakers. For example, the subwoofer may be joined to a group of one speaker, two speakers which are configured themselves to be a stereo pair, three speakers, etc. Typically a group in a home theater environment includes a 2.1, 3.1, 4.1, or 5.1 (most common) configuration with 2-5 speakers (indicated by the digit before the decimal point) and one subwoofer (indicated by the digit after the decimal point). A typical home theater is 5 speakers and a subwoofer (0.1) consisting of left-front, center, right-front, surround-left, surround-right and the subwoofer. Optionally, to provide more bass (in a larger room for example) one may add multiple subwoofers. As used herein, a group may refer to all of these options, among others.

As used within this disclosure, a "user" refers to a person consuming media from a media rendering device, and/or a person operating a controller for the media rendering device.

As used within this disclosure, "portrait mode" refers to an operation configuration of a controller device corresponding to orientation of a display screen where the top and bottom edges of the display screen are shorter than the side edges.

As used within this disclosure, "landscape mode" refers to an operation configuration of a controller device corresponding to orientation of a display screen where the top and bottom edges of the display screen are longer than the side edges. In both portrait and landscape mode, text on the display is generally arranged to be oriented with respect to the top edge of the screen.

As used within this disclosure "local media" or "local source" may refer to music and or media stored on the user's phone or controller or music stored on a USB memory device which is connected to one of the media renderers and shared across the network to other media renderers.

As used within this disclosure, a local device, such as a server, refers to a network element directly connected to a local area network (LAN), while a remote device refers to an item that may be in communication with local network elements, for example, via the internet, but is not directly connected to the LAN. Examples of a LAN include a wireless (WiFi) LAN or a wired LAN, for example, connected via Ethernet cables.

As used within this disclosure, a "playlist" is a modifiable data structure containing an ordered list of media, or an ordered list of references to media. A playlist may be stored, for example, on a rendering device or a server, or within a storage medium, such as a hard drive, thumb drive, or optical disc. A playlist may be modified to add, remove, and/or re-order media or media references. Since playlists containing media references do not contain audio or video content, they are generally small in size and therefore readily transportable. A display playlist is a text listing of media in a playlist, and may include a subset of identifying parameters of a media, such as title, artist, duration, and date, among others. A play queue refers to a playlist that is currently being rendered by a rendering device. The head of the play queue refers to the next media file to be rendered after the currently rendered media program, while the tail of the play queue refers to the location of the play queue indicating the final media in the play queue to be rendered.

As used within this disclosure, "streaming" refers to a process of real-time transmitting of a media program by a source to a rendering device. The rendering device may begin rendering the media before the entire program has been transmitted. Streaming is generally transitory, such that the streamed data is not retained after it has been rendered. Portions of a received stream may be buffered for rendering, for example, to ensure rendering is uninterrupted during short interruptions of the streamed transmission. In contrast, a downloaded digital multimedia file is generally received in its entirety before it may be rendered. A downloaded digital multimedia file is generally retained in a memory for subsequent rendering, while a streamed file is generally re-streamed for subsequent renderings. "Streaming a song" is shorthand for streaming audio media.

As used within this disclosure, "GUI" is a graphical user interface, and in particular, may be a touch-screen interface or an on-screen TV based interface. A graphical user interface or GUI, sometimes pronounced /'guːi/ ("gooey") is a type of interface that allows users to interact with electronic devices through graphical objects, or icons, and visual indicators such as secondary notation, referred to herein as "objects," as opposed to text-based interfaces, typed command labels or text navigation. It should be noted a graphical icon may include text, or may entirely consist of text. An ordered list of objects in a GUI may be referred to as a "menu." Menus may be stationary, may drop down from top of the display (a "drop-down menu"), or may pop up to fill the screen or a portion of the screen when an object is selected (a "pop-up menu"). The actions in the GUI are usually performed through direct manipulation of the objects. As used herein, "selecting" refers to touching an object, for example with a finger or stylus. Selecting may also be accomplished without a touch screen, for example, with a TV UI using a remote control and an item on screen which is highlighted then selected by the user pressing a button on the remote control.

A "drag-and-drop" operation refers to selecting a first object with a touch of the touchscreen, and moving the finger/stylus from the first object to another location (often with a ghost or outline of the object tracking the movement) corresponding to a second object. The second object may become highlighted when the ghost is dragged over it, indicating the second object is able to "receive" the first object. The drag-and-drop operation may be thought of providing the dragged object as an input to the second object. The operation resulting from the drag-and-drop operation is generally generation of a command to a media rendering device controlled by the controller, the scope of which may depend upon context or the mode of the display during the operation.

An object refers to an item represented by a graphical icon or visual indicator, for example, a media source, a media file, or a media rendering device.

Reference will now be made in detail to embodiments of the present invention, examples of which are illustrated in the accompanying drawings. Wherever possible, the same reference numbers are used in the drawings and the description to refer to the same or like parts.

Figure 2:
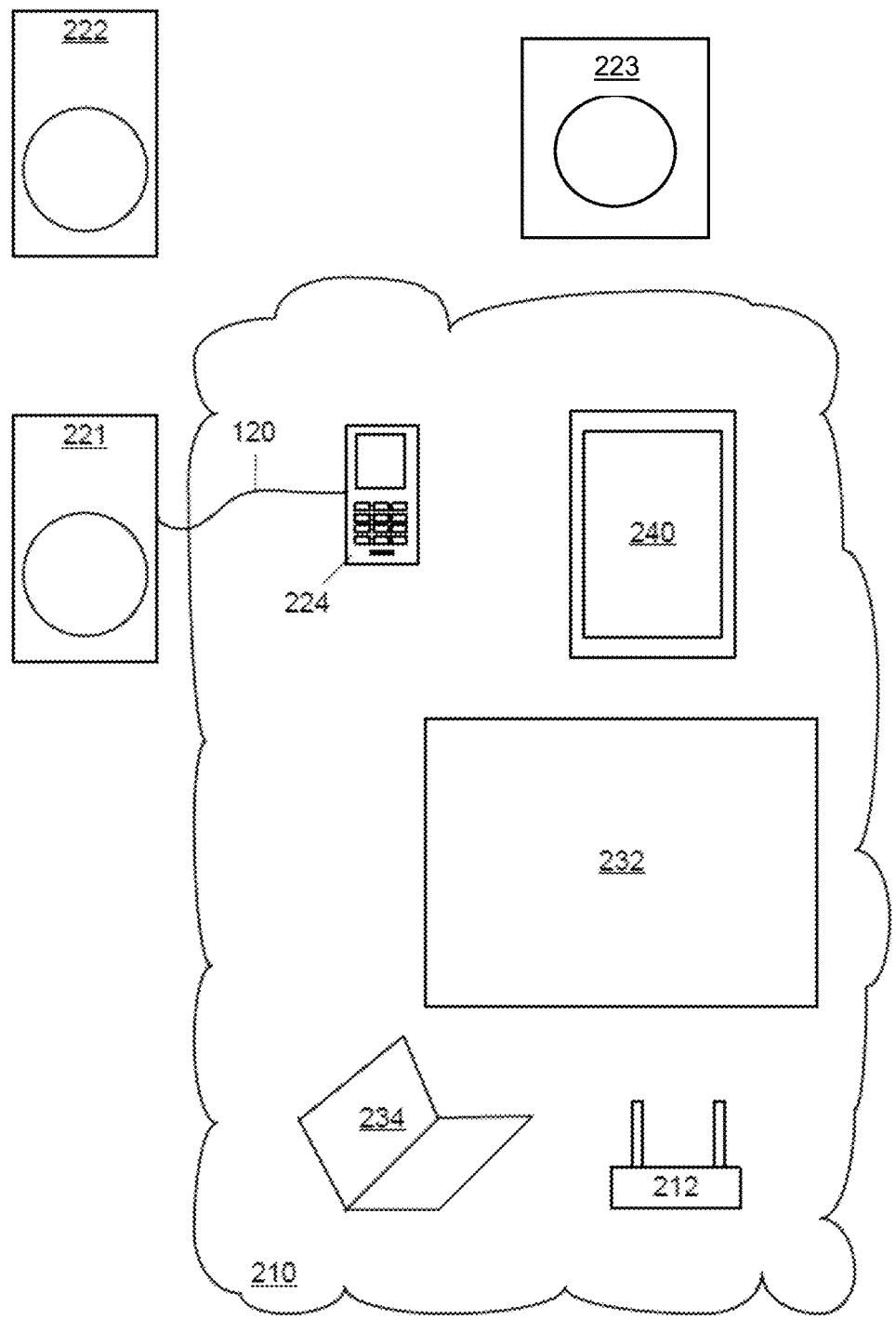
FIG. 2 is a schematic diagram showing a wireless network during manual network configuration of a first player.

FIG. 2 is a schematic diagram showing a wireless network during manual network configuration of a first player. As shown by FIG. 2, a data communications network 210, for example, a home WiFi network including a WiFi router 212 or wireless access point, may be in communication with multiple WiFi enabled devices, for example, a smart phone 224, a laptop computer, 234, a television 232, and a tablet computer 240. One or more audio player devices, for example, two audio player devices 221, 222, referred to as "players" herein for simplicity, are WiFi enabled, but are not configured to communicate with the network 210. Further, one or more subwoofer 223 is provided which is WiFi enabled, but is not configured to communicate with the network 210. The WiFi network may be, for example, an IEEE 802.11bgn network, among other possible networks.

A computing device, for example, one or more of the smart phone 224, the laptop computer 234, and the tablet computer 240, is configured to run an application controlling one or more players 221, 222, and to further join one or more subwoofer 223 with the one or more players 221, 222 in a group 220 (FIG. 3) for control thereof through the one or more players 221, 222.

For simplicity herein, a first exemplary embodiment assumes the smart phone 224 is hosting the controller application. Similarly, while the embodiments described generally refer to joining a subwoofer 223 to a group, a person having skill in the art will understand that the embodiments may generally be extended to joining other audio devices to a group, for example, a center speaker, rear speaker, etc.

The controller application on the smart phone 224 allows a user of the controller application to control and/or configure one or more audio devices, for example, players 221, 222, and one or more subwoofers 223. Players may be, for example, speakers containing audio amplifiers and a WiFi interface configured to render a received music stream. For example, the players 221, 222 may render a music stream received from the controller application on the smart phone 224 or another streaming source via the network 210. While the described embodiments herein generally include players as audio devices for exemplary purposes, audio devices are not limited to players, and may also include other WiFi enabled audio devices, for example, pre-amplifiers and audio processors.

The players 221, 222 may both be a single type of device, or they may be different types of devices. Once the players 221, 222 are added to the network 210, the controller application on the smart phone 224 may allow a user of the smart phone 224 to control the players 221, 222. For example, the user of the smart phone 224 may use the controller application on the smart phone 224 to control operating parameters of the players 221, 222, such as volume, balance, and/or equalization. The controller application on the smart phone 224 may directly stream program material, such as an audio stream, to the players 221, 222, or may select program material to be streamed to the players 221, 222 from an internet source via the router 212 of the WiFi network 210.

Further, once the one or more subwoofers 223 are added to the network 210, they may be joined with any one or more players 221, 222 in the network. Once joined with one or more players 221, 222, the user of the smart phone 224 may use the controller application on the smart phone 224 to control operating parameters of the players 221, 222, which in turn, controls the one or more subwoofer 223.

The players 221, 222 and one or more subwoofer 223 may include a processor or a computer system. Initially, the players 221, 222 and subwoofer 223 are not configured to communicate via the network 210, so the controller application on the smart phone 224 may communicate with the players 221, 222 and subwoofer 223 via another means, for example, a Bluetooth connection or a hard-wired connection. For example, the controller application on the smart phone 224 may be physically connected to the first player 221 via a cable 120, such as an analog audio cable, an ethernet cable, or a Universal Serial Bus (USB) cable. The controller application on the smart phone 224 establishes a communication channel with the first player 221 over the cable 120, for example, a duplex communication channel. The controller application on the smart phone 224 may provide network credentials for the network 210 to the first player 221 over the cable 210.

Figure 3:
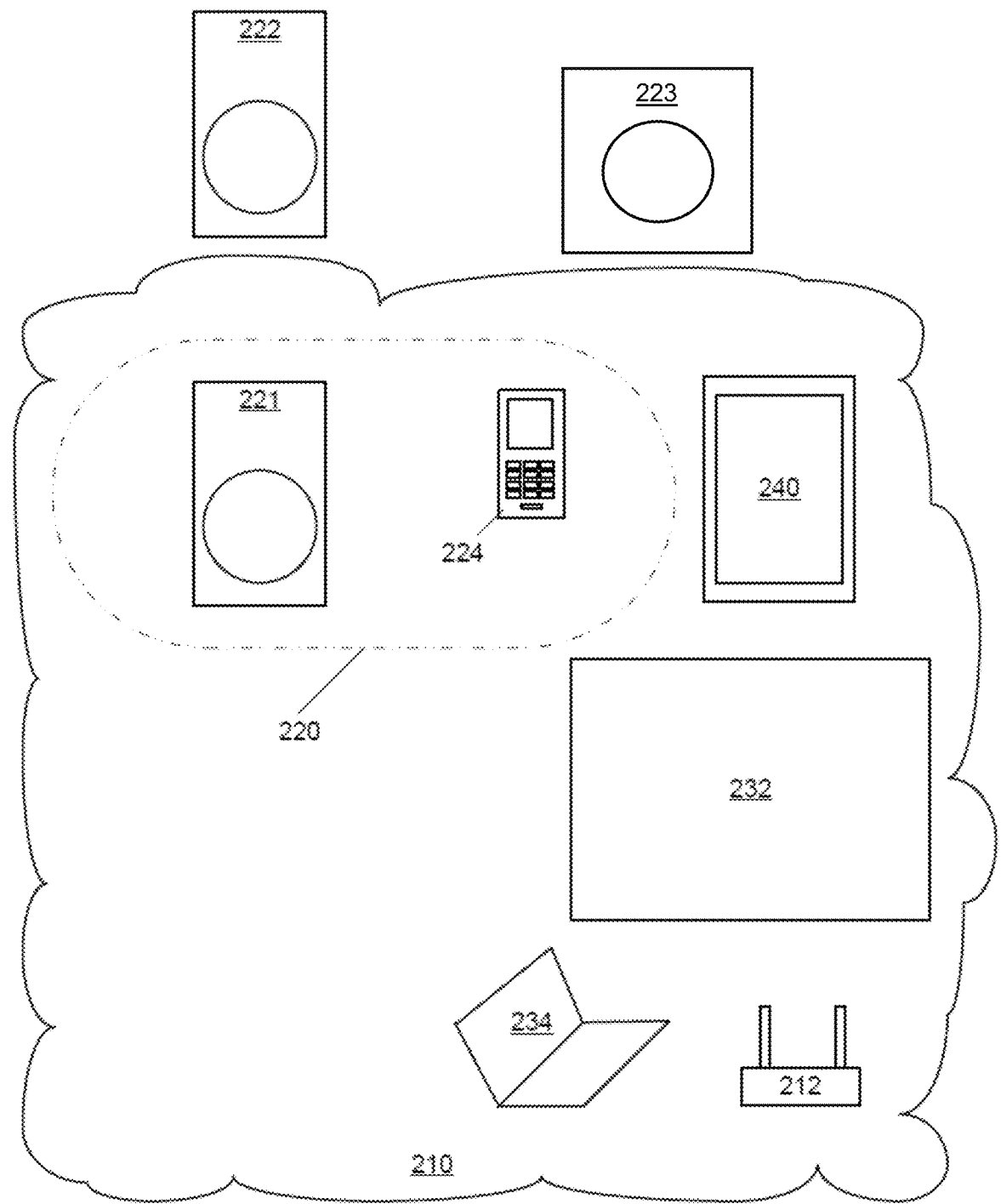
FIG. 3 is a schematic diagram showing the wireless network of FIG. 2 after the first player has joined the network.
Figure 4:
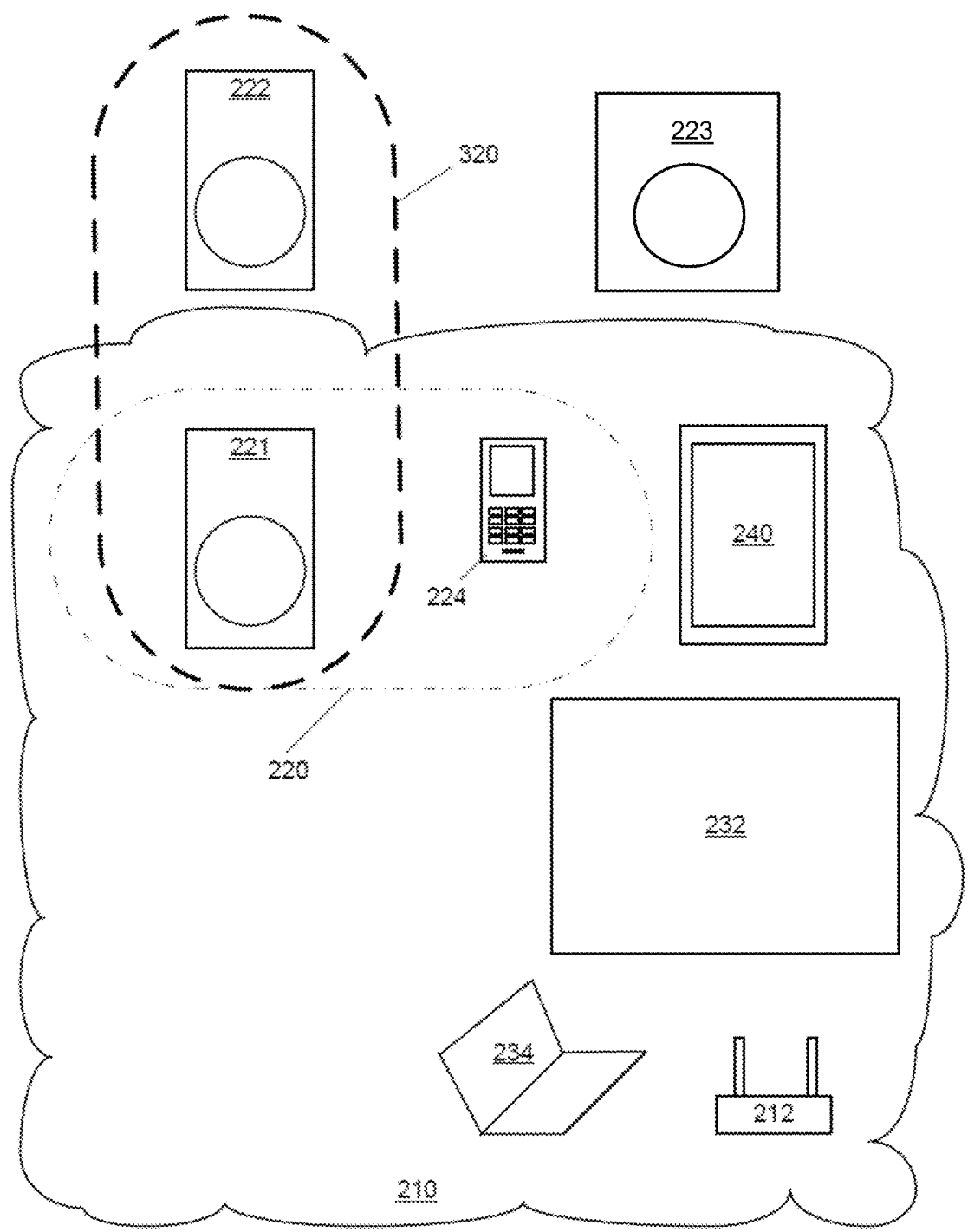
FIG. 4 is a schematic diagram showing the wireless network of FIG. 3 with the first player in a bridging network with a second player.
Figure 5:
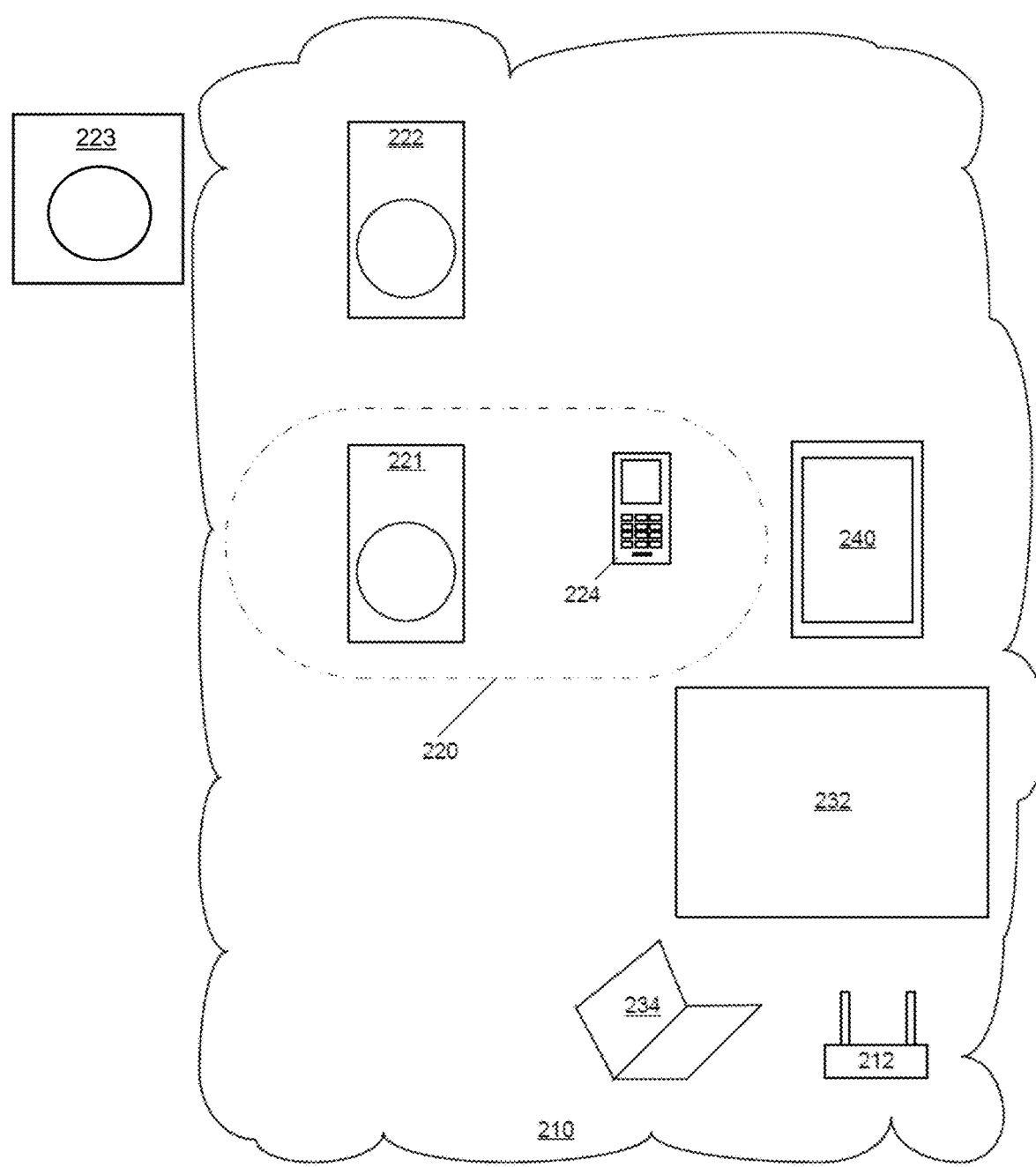
FIG. 5 is a schematic diagram showing the wireless network of FIG. 4 after the second player has joined the network.

The first player 221 establishes a connection with the network 210 ("joins the network") with the provided network credentials, as shown in FIG. 2. The cable 120 (FIG. 1) between the controller application on the smart phone 224 and the first speaker 221 may optionally be disconnected. The controller application on the smart phone 224 discovers the first player 221, and adds the first speaker 221 to a group 220 (FIG. 3). The group 220 includes the controller application on the smart phone 224 and one or more audio devices that may be configured by and/or controlled by the controller 224. As shown in FIG. 3, the group 220 includes the player 221 and the controller application on the smart phone 224.

Figure 11:
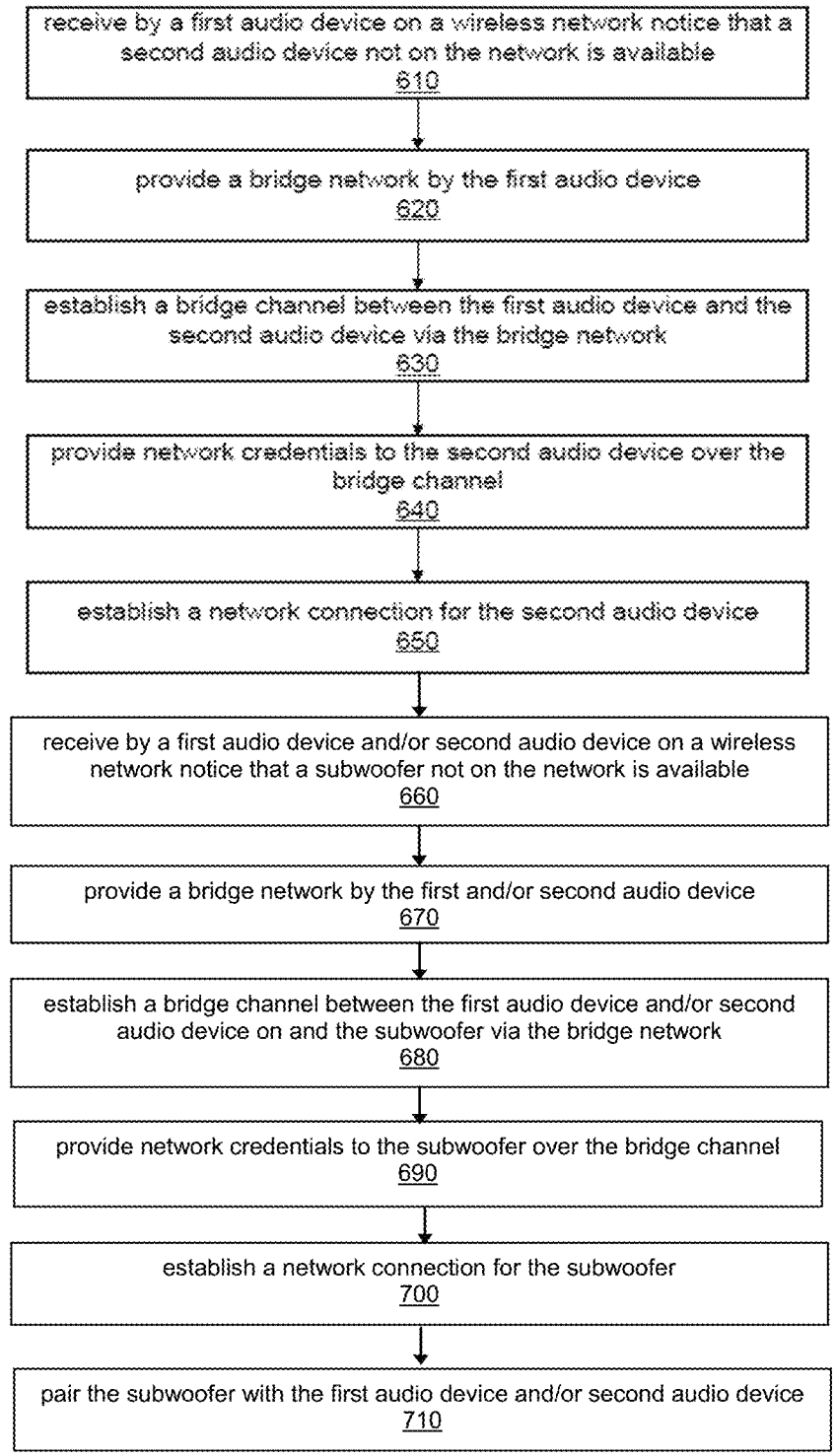
FIG. 11 is a flowchart of an exemplary method for configuring an audio device and subwoofer to join a wireless network and joining the subwoofer with the audio device.

FIG. 11 is a flowchart of an exemplary embodiment of a method to wirelessly add a second player 222 to the network 210 and subsequently add and join a subwoofer 223. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention. The method is described here referencing FIGS. 2-5.

A first audio device (player 221) on the network is given notice that a second audio device (player 222) not on the network is available, as shown by block 610. For example, a user may use a graphical user interface (GUI) on a controller application on the smart phone 224 to notify the application on the controller 224 that the second audio device 222 is available, and the application on the controller 224 may transmit a notice message to the first audio device 221. In response to this notice message, the first audio device 221 provides a bridge network 320 (FIG. 4), as shown by block 620. The bridge network 320 may be a wireless network distinct from the network 212. The bridge network 320 may be WiFi, BlueTooth, ZigBee, RF, or another wireless network protocol. The bridge network 320, or temporary AP, is generally a short duration network, where the bridge network is established temporarily during a configuration time window, and disabled after configuration is complete. In general, the bridge network 320 includes a proprietary protocol, so that only pre-configured audio devices will recognize and/or be recognized by the bridge network 320. The second player 222 detects the first audio device 221 and connects to the bridge network 320, for example, using a pre-shared key (PSK).

A bridge communication channel is established between the first audio device 221 and the second audio device 222 via the bridge network 320, as shown by block 630. The first audio device 221 may notify the controller 224 that the first audio device 221 has established a bridge channel over the bridge network 320 with the second audio device 222.

The user of the smart phone 224 may be prompted by the controller application on the smart phone 224 to request the second audio device 222 to initiate a handshake with the first audio device 221 over the bridge network 320 so that the first audio device 221 and second audio device 222 can exchange network credentials. For example, the application on the controller 224 may display a visual prompt via the controller application GUI instructing the user to manually initiate the handshake by pushing a button on the second audio device 222. Alternatively, the second audio device 222 may alert the user to manually initiate the handshake, for example, with a flashing LED or an audio signal such as a loud beep, or even by playing a pre-recorded audio message. The user may respond to this alert by manually initiating the handshake via a button push on the second audio device 222.

Figure 6:
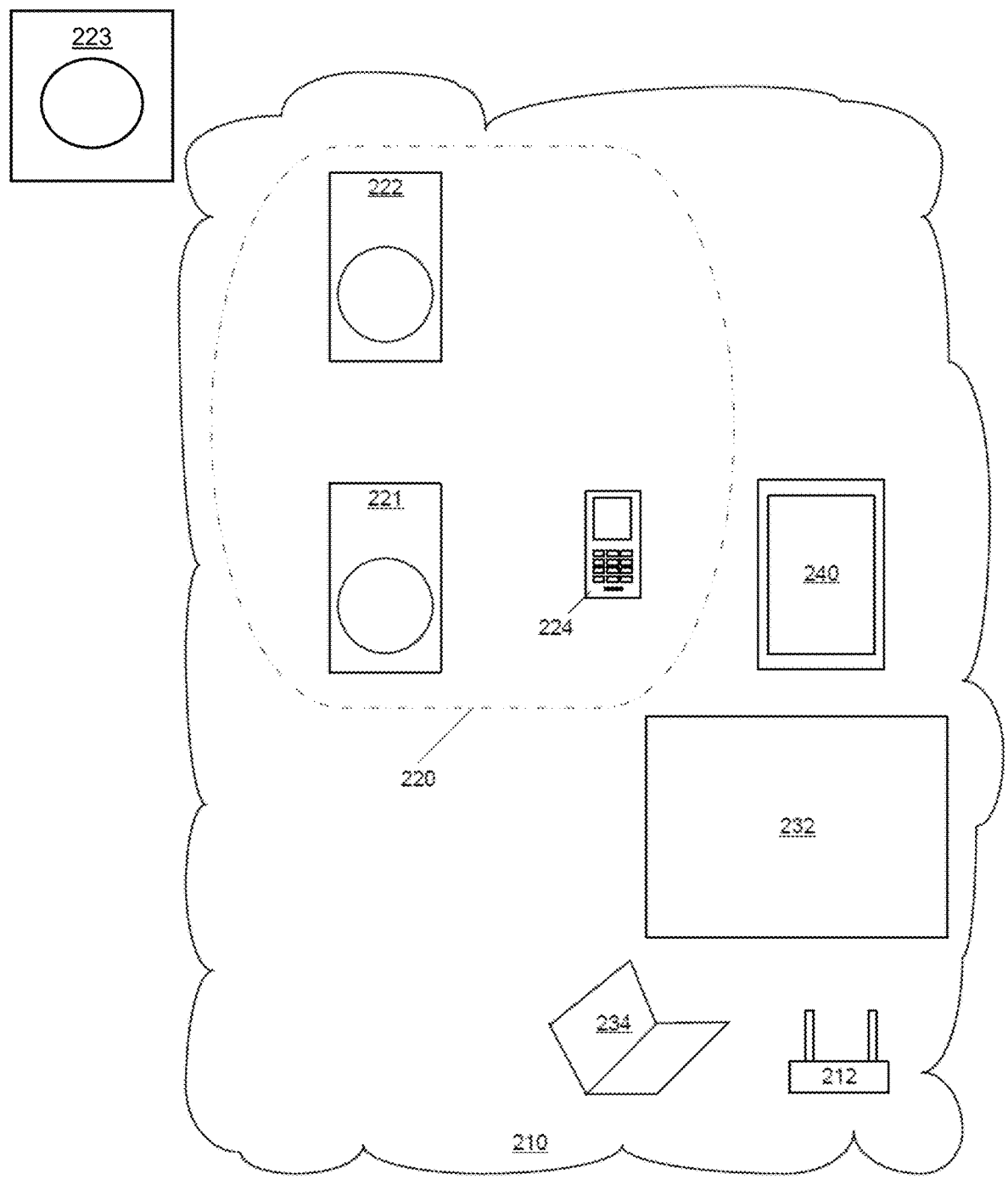
FIG. 6 is a schematic diagram showing the wireless network of FIG. 5 after the controller has discovered the second player.
Figure 7:
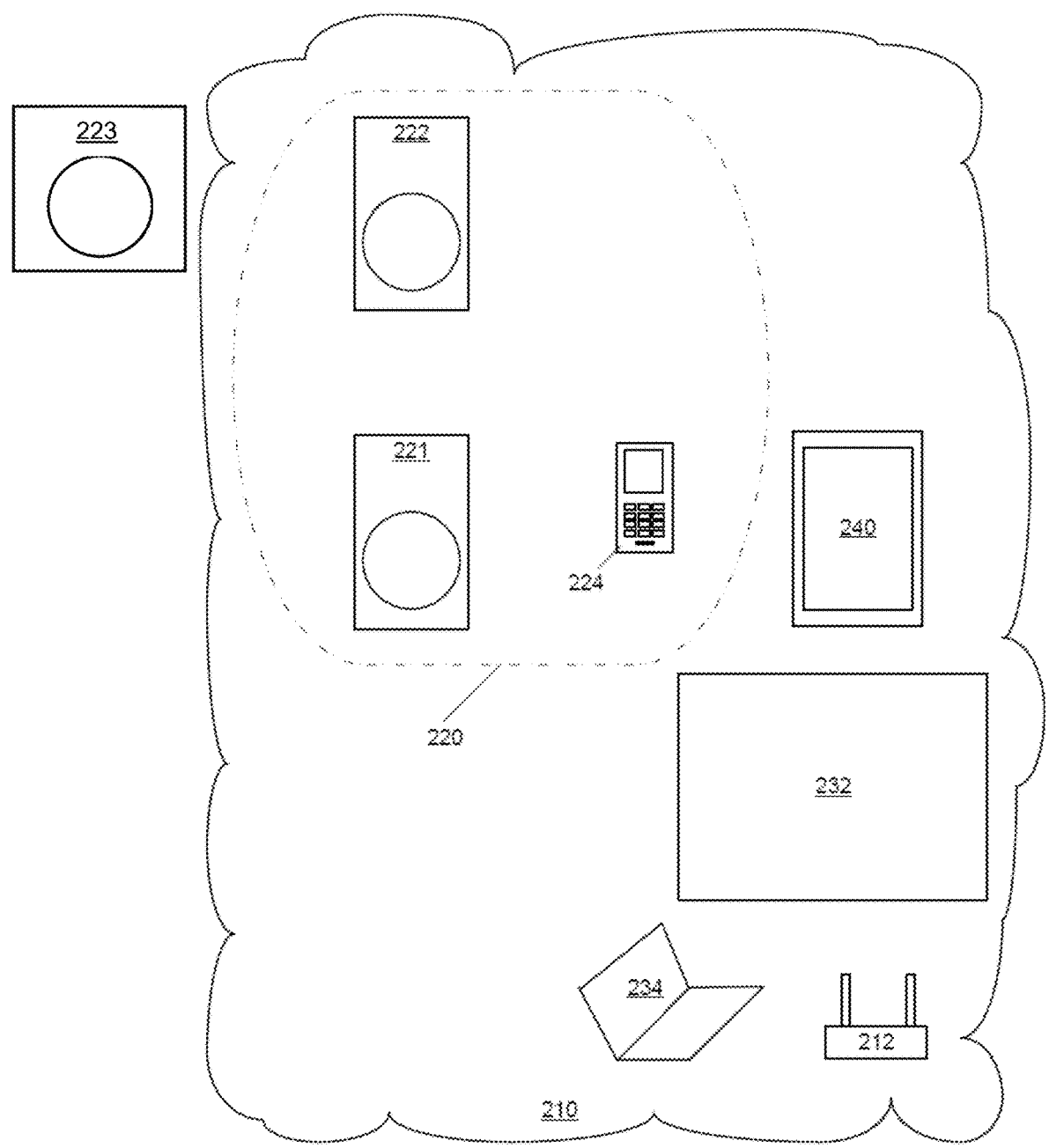
FIG. 7 is a schematic diagram showing the wireless network with the second player before forming a bridging network with a subwoofer.

The first audio device 221 provides network credentials for the network 210 to the second audio device 222 over the bridge network 320 channel, as shown by block 640. The second audio device 222 establishes connection to the network 210 using the network credentials provided to the second audio device 222 by the first audio device 221, as shown by block 650 and FIG. 5. The bridge network 320 may be discontinued after the second audio device 222 has joined the network 210. The controller application on the smart phone 224 may discover the second audio device 222 on the network 210, for example, using a discovery protocol. Once the controller application on the smart phone 224 has discovered the second audio device 222, the controller application on the smart phone 224 may add the second audio device 222 to the group 220. FIG. 6 is a schematic diagram showing the wireless network after the controller has discovered the second audio device 222.

Next, the first audio device (player 221) and/or the second audio device (player 222) on the network 210 is given notice that a subwoofer 223 not on the network 210 is available, as shown by block 660. For example, a user may use a graphical user interface (GUI) on a controller application on the smart phone 224 to notify the application on the controller 224 that the subwoofer 223 is available, and the application on the controller 224 may transmit a notice message to the first audio device 221 and/or second audio device 222. In response to this notice message, the first audio device 221 and/or second audio device 222 provides a bridge network 320 (FIG. 4), as shown by block 670.

The bridge network 320 may be a wireless network distinct from the network 210. The bridge network 320 may be WiFi, BlueTooth, ZigBee, RF, or another wireless network protocol. The bridge network 320, or temporary AP, is generally a short duration network, where the bridge network is established temporarily during a configuration time window, and disabled after configuration is complete. In general, the bridge network 320 includes a proprietary protocol, so that only pre-configured audio devices will recognize and/or be recognized by the bridge network 320. The first audio device 221 and/or second audio device 222 detects the subwoofer 223 and connects to the bridge network 320, for example, using a pre-shared key (PSK).

A bridge communication channel is established between the subwoofer 223 and first audio device 221 and/or second audio device 222 via the bridge network 320, as shown by block 680. The first audio device 221 and/or second audio device 222 may notify the controller 224 that the first audio device 221 and/or second audio device 222 has established a bridge channel over the bridge network 320 with the subwoofer 223.

The user of the smart phone 224 may be prompted by the controller application on the smart phone 224 to request the subwoofer 223 to initiate a handshake with the first audio device 221/and/or second audio device 222 over the bridge network 320 so that the subwoofer 223 and the first audio device 221 and/or second audio device 222 can exchange network credentials as discussed above.

Figure 8:
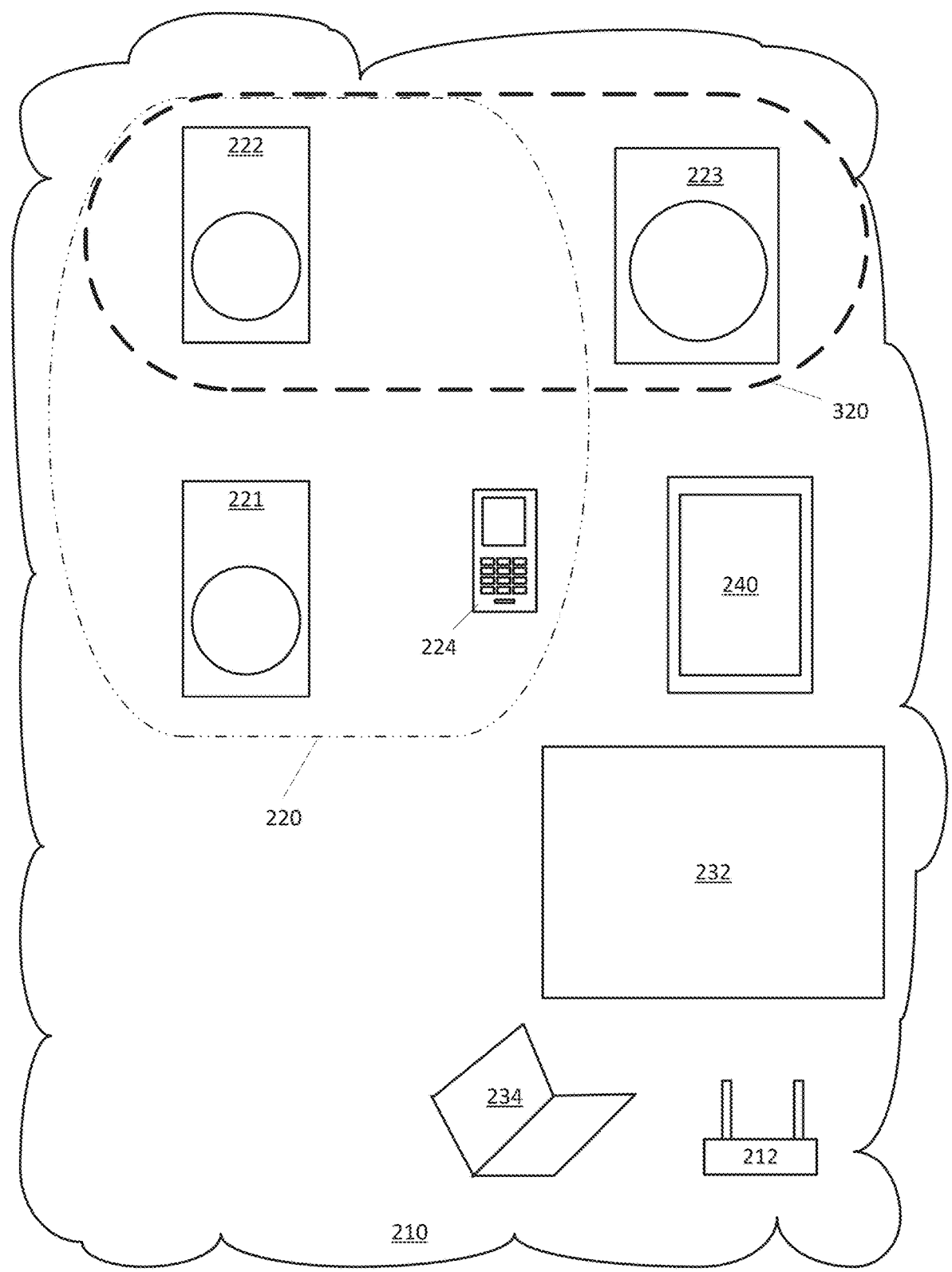
FIG. 8 is a schematic diagram showing the wireless network after a subwoofer has joined the bridging network.
Figure 9:
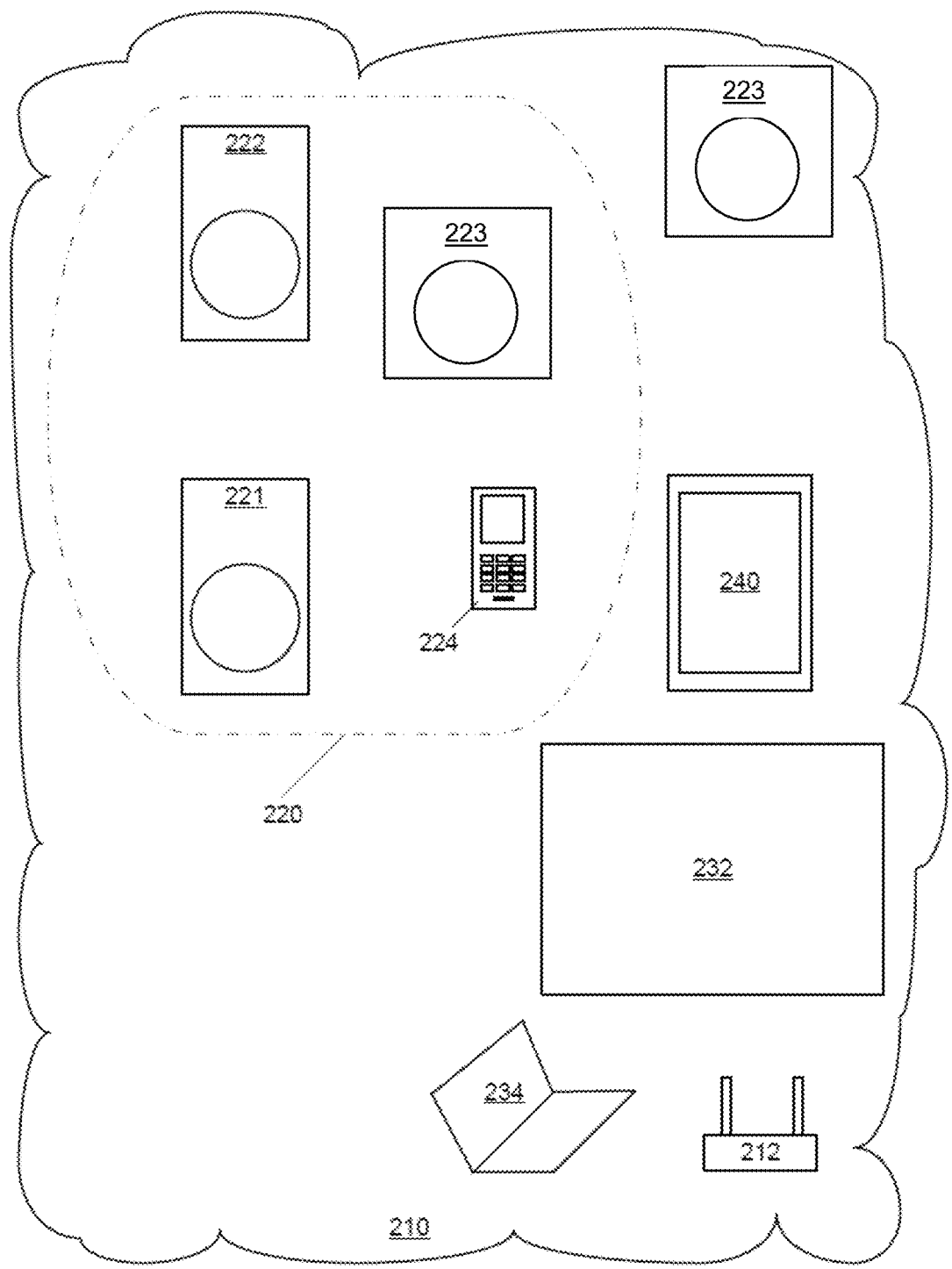
FIG. 9 is a schematic diagram showing the wireless network after the controller has discovered the subwoofer and the subwoofer has been joined with the first and second players.
Figure 10:
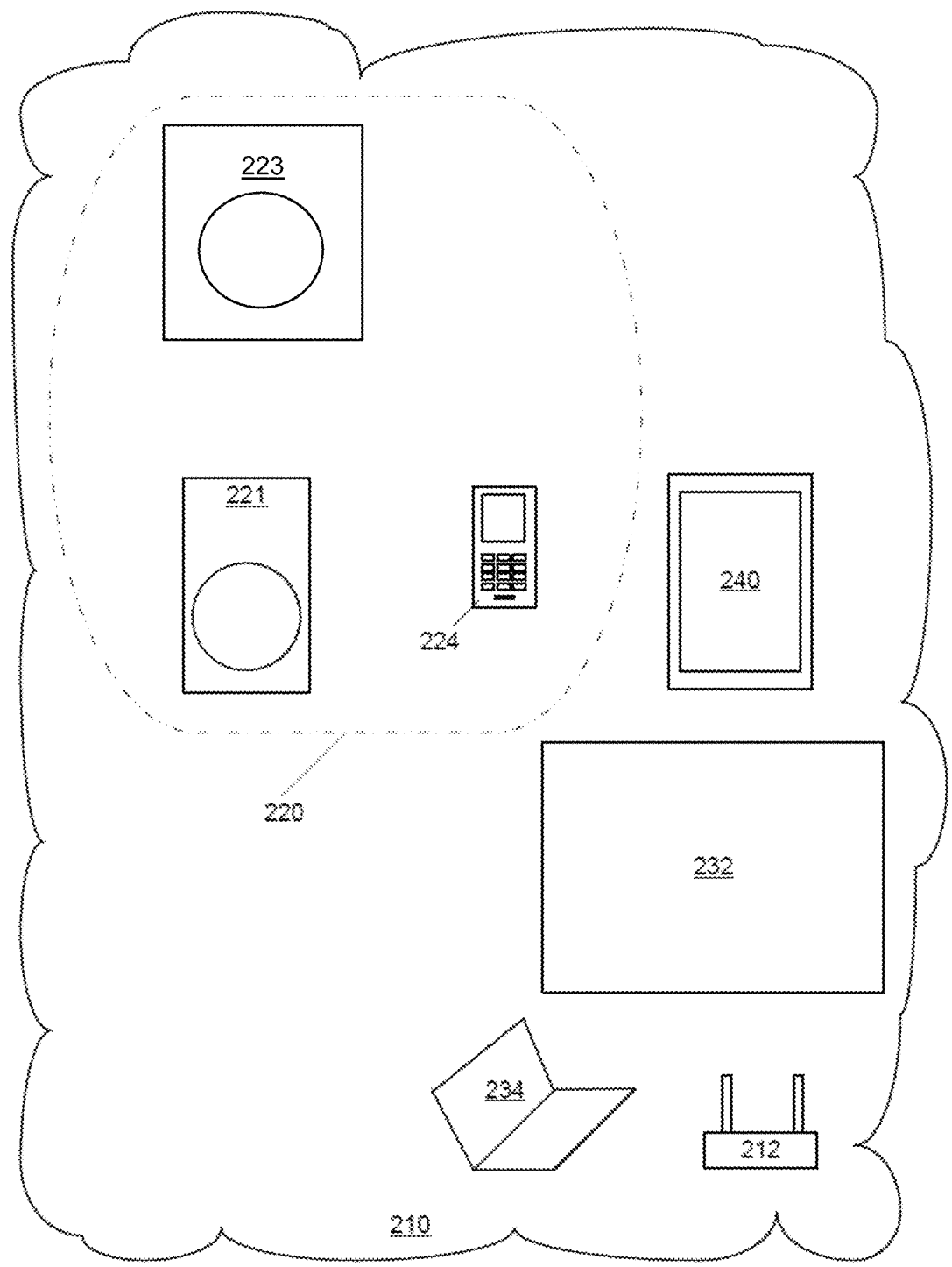
FIG. 10 is a schematic diagram showing another embodiment of a wireless network having only a first player, and after the controller has discovered the subwoofer and the subwoofer has been joined with the first player.

The first audio device 221 and/or second audio device 222 provides network credentials for the network 210 to the subwoofer 223 over the bridge network 320 channel, as shown by block 690. The subwoofer 223 establishes connection to the network 210 using the network credentials provided, as shown by block 700 and FIG. 8. The bridge network 320 may be discontinued after the subwoofer 223 has joined the network 210. The controller application on the smart phone 224 may discover the subwoofer 223 on the network 210, for example, using a discovery protocol. Once the controller application on the smart phone 224 has discovered the subwoofer 223, the controller application on the smart phone 224 may add the subwoofer 223 to the group 220 by joining the subwoofer with the first audio device 221 and/or second audio device 222 of the group 220. FIG. 9 is a schematic diagram showing the wireless network after the controller has discovered the subwoofer 223. As shown by FIG. 11, the subwoofer is then joined with the first audio device and/or the second audio device (block 710) of the group 220.

Figure 17:
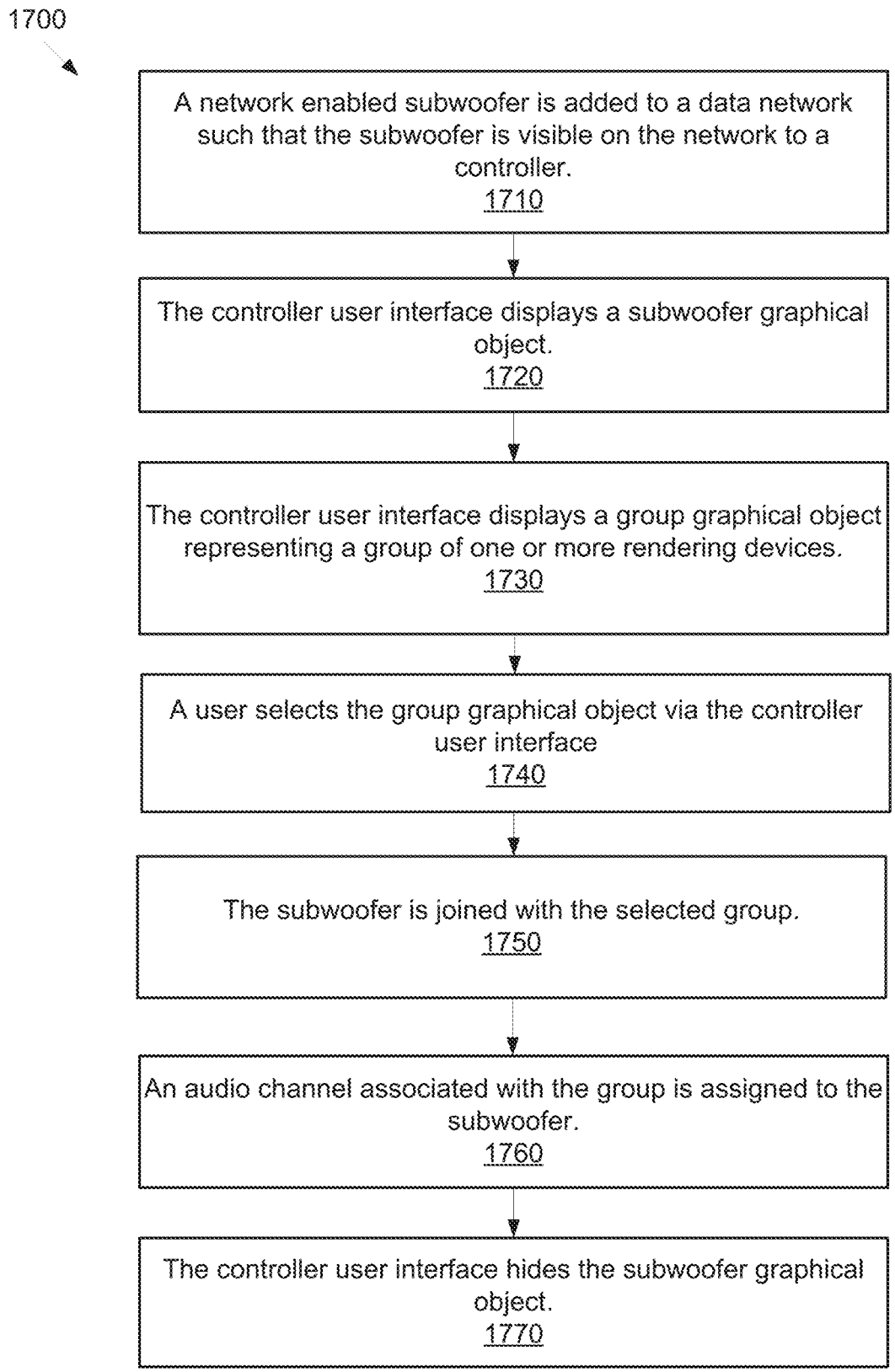
FIG. 17 is a flowchart of an exemplary embodiment of a method for controlling a plurality of media rendering devices in a data network with a controller device.

FIG. 17 is a flowchart 1700 showing an exemplary embodiment of a method for controlling a plurality of media rendering devices in a data network with a touch screen controller device. The flowchart 1700 is described making reference to elements shown by FIG. 9. A network enabled subwoofer 223 is added to the data network 210, such that the subwoofer is visible on the network to a controller 224, as shown by block 1710. A user interface of the controller 224, for example, a GUI, displays a subwoofer graphical object, as shown by block 1720. The subwoofer graphical object may be, for example, an icon representing the subwoofer 223, or text identifying the subwoofer 223 that may be manipulated via the user interface of the controller 224, for example, via a drag-and-drop operation in the GUI.

The controller 224 user interface displays a group graphical object representing a group 220 of one or more rendering devices 221, 222 as shown by block 1730. The group graphical object may be, for example, an icon representing the group 220, or text identifying the group 220 that may be manipulated via the user interface of the controller 224, for example, via a drag-and-drop operation in the GUI. The controller 224 may display one, two or more groups 220, for example, each group 220 representing a collection of rendering devices 221, 222 in a separate room. If no groups 222 are present, the controller 224 may generally not present the user an option to form a group 220 of a solo subwoofer 223, instead displaying the subwoofer graphical object separately until a group 220 is available for the subwoofer 223 to join.

A user selects one group graphical object via the controller 224 user interface, as shown by block 1740. For example, the user may drag and drop the subwoofer graphical object upon the selected group graphical object, indicating the subwoofer 223 is to join the selected group 220 represented by the selected group graphical object. The subwoofer 223 is joined with the selected group 220, as shown by block 1750. For example, the controller 224 and/or a rendering device 221, 222 of the group 220 designated as a group leader logically associates the subwoofer 223 as being part of the group 220, so that functions of the subwoofer 223 may be controlled via configuration commands for the group 220 received, for example, by the controller 224, for example, a change volume command.

An audio channel associated with the group 220 is assigned to the subwoofer 223, as shown by block 1760. For example, the audio channel may be a pre-processed dedicated subwoofer channel, where the channel received by the subwoofer 223 is frequency bandlimited appropriately to the capabilities of the subwoofer 223, or the subwoofer 223 may be configured to derive its output from one or more received audio channels, for example, to derive and render a low frequency audio channel from left and right channels of a stereo pair.

The controller 224 user interface hides the subwoofer graphical object, as shown by block 1770. After the subwoofer 223 has been joined with the group 220, the controller 224 user interface generally does not present the subwoofer 223 as an independent entity, but rather as an integral component of the group 220, as it is generally not desirable for a subwoofer 223 to be associated with more than one group 220. The user interface of the controller 224 may provide means for removing the subwoofer 223 from the group 220, for example, via a dedicated subwoofer configuration page, so that the unassociated subwoofer 223 may subsequently be graphically displayed to indicate availability to be joined to the same group 220 or a different group 220.

Drag and Drop Interface for Joining Subwoofer

According to embodiments of the present invention, a user interface for controlling the media rendering device is provided.

Figure 13:
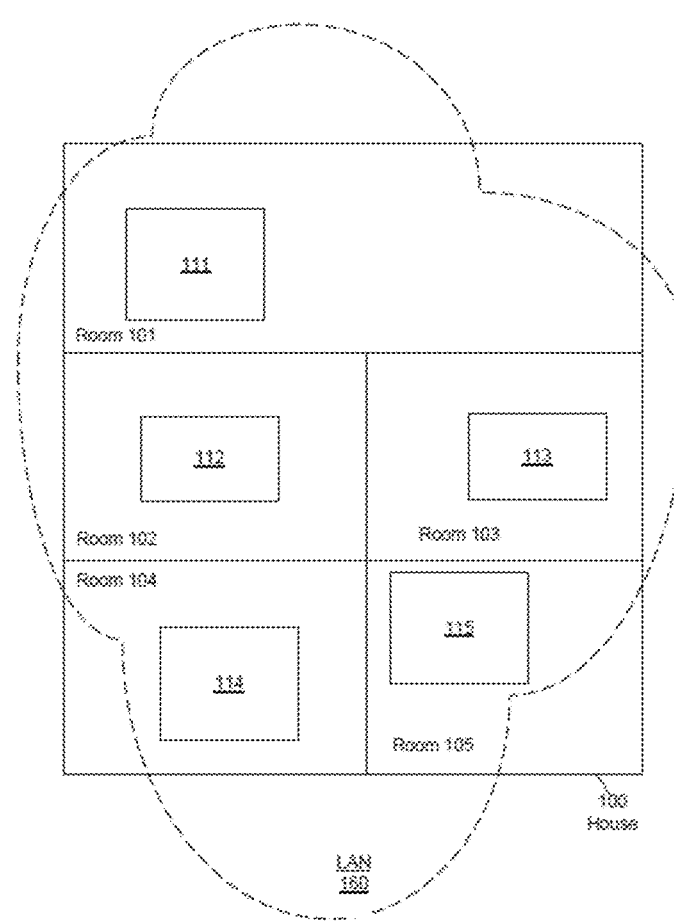
FIG. 13 is a schematic diagram of a premises containing multiple networked media rendering devices and/or groups.

FIG. 13 shows an exemplary embodiment of a system with multiple media rendering devices. A house 100 includes five media rendering devices and/or groups 111-115 arranged in five rooms 101-105. The house 100 is served by a local area network (LAN) 160, for example, a household wireless network. The first room 101 includes a first media rendering device 111. The second room 102 includes the second media rendering device 112. The third room 103 includes the third media rendering device 113. The fourth room 104 includes the fourth media rendering device 114. The fifth room 105 includes the fifth media rendering device 115.

Each of the five media rendering devices 111-115 may be in communication with one or more controllers (not shown) via the LAN 160. Alternatively, a control panel on one or more of the media rendering devices 111-115 may serve as a controller for all of the media rendering devices 111-115. The media rendering devices 111-115 may be individually controlled, or two or more rendering devices 111-115 may be linked so that they may operate under common control.

Figure 14B:
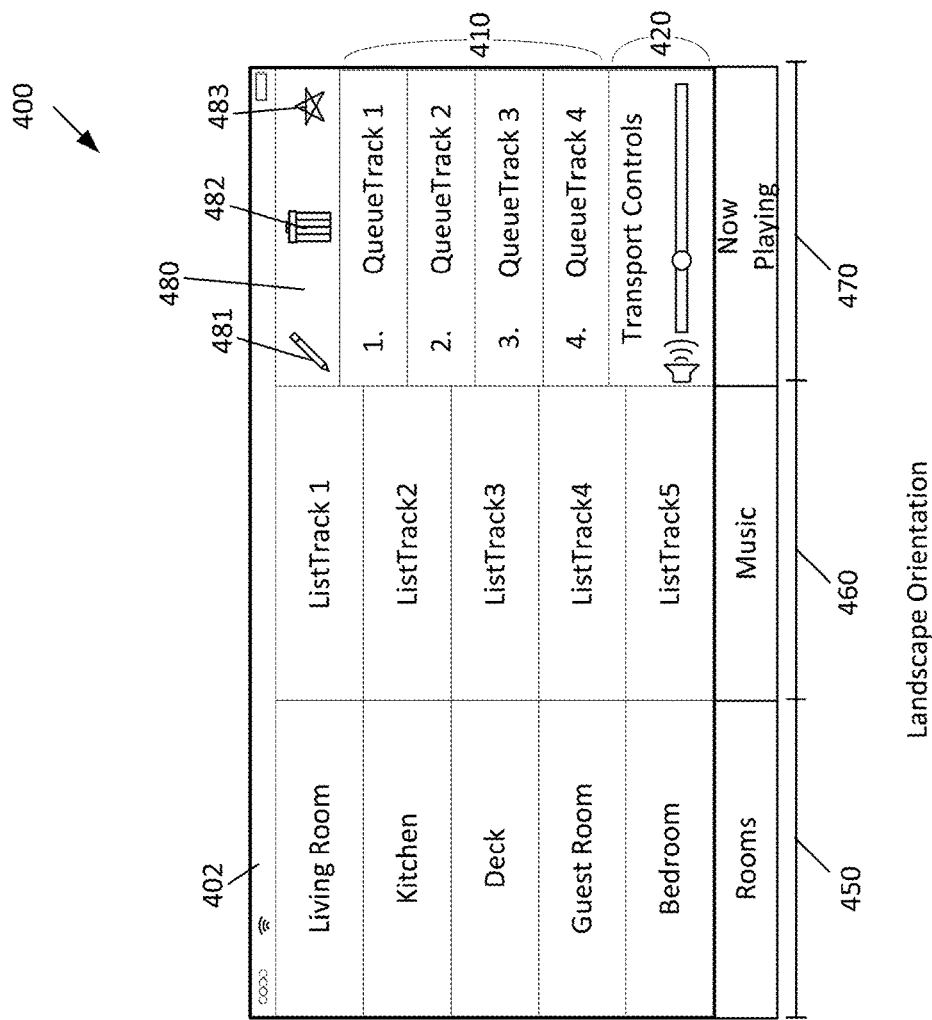
FIG. 14B is a schematic diagram of a screen of the first embodiment in landscape orientation.

As described above, navigating multiple control screens in a controller application may be cumbersome. There are advantages provided by combining the content of two or more of these screens. For example, while a single screen may be displayed in portrait orientation, two or more screens may be displayed as side-by-side files 450, 460, 470 in landscape orientation, as shown in FIG. 14B. The tiles 450, 460, 470 may show shortened or otherwise reduced versions of the menus displayed in portrait orientation.

Figure 14A:
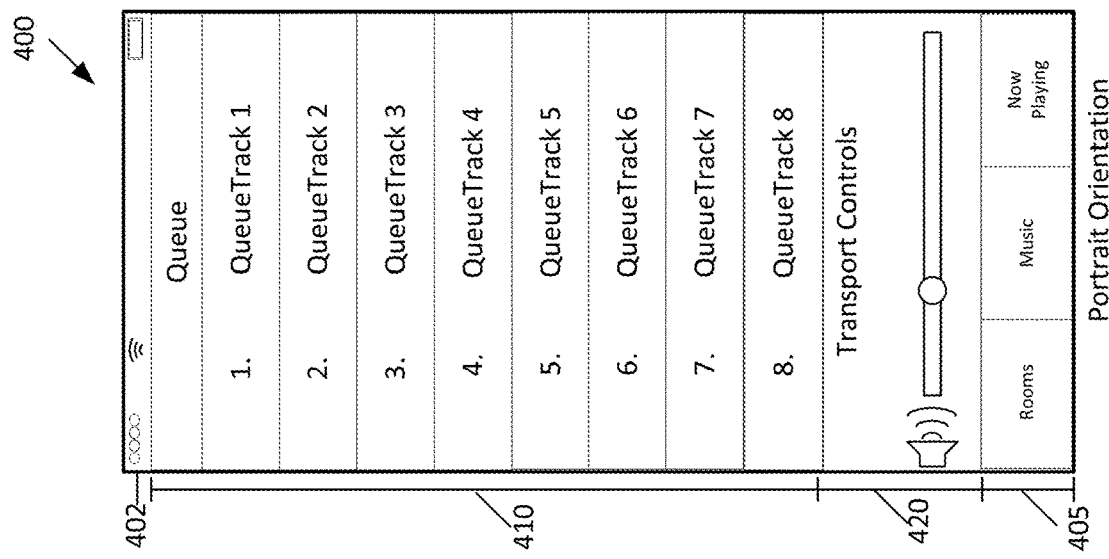
FIG. 14A is a schematic diagram of a screen of a first embodiment of a controller for a media rendering system in portrait orientation.

As shown in FIG. 14A, a user interface 400 for an exemplary first embodiment of a controller, such as a handheld computing device with a touchscreen display, hosts an application (or "app") to control the multi-room speaker system in the LAN 160 (FIG. 13). The controller has an orientation sensor, such that the control device may determine the orientation of the display screen, and change the presentation of the display screen accordingly. The user interface 400 has a first display mode when oriented in a vertical (portrait) position, as shown in FIG. 14A, and a second display mode when oriented in a horizontal (landscape) position, as shown in FIG. 14B.

The very top of the interface 400 generally includes a system bar 402. The system bar is displayed in both landscape orientation and portrait orientation. In general, the system bar 402 may be configured by an operating system of the controller, and may include text and/or graphical objects indicating the network and/or cell signal strength, time of day, and battery level, among others. Hereinafter, references to the top of the screen refer to the top of the display interface 400 below the system bar 402. Further, since the user interface for the controller includes a touch sensitive display screen, the interface 400 may be interchangeably referred to as the interface, display screen, touch screen, display, or screen.

In portrait orientation, the interface 400 may be configured substantially according to the earlier description of the interface of a prior art controller as shown in FIG. 1. In the portrait orientation, the interface 400 displays a tab selector 405 at the top or bottom of the interface 400. A first tab selects a first view of a first menu, for example, a room list view, where each room in the network may be listed by name. Each listed room may indicate the name of the room, and or the type of media rendering device within the room. Other information may also be presented, for example, the type of media currently being rendered by the media rendering device in that room. Selecting a room in the room list selects a target room for selections in other tabs. Rooms in the room menu that include rendering devices under common control may be indicated visually, for example, by a commonly colored boundary.

A second tab in portrait orientation may select a second view, for example, a menu listing media sources, such as a playlist stored on the device, a broadcast playlist, or a streamed or broadcast media. Other media sources may include playlists stored on other devices available to the network 160 (FIG. 13). Selecting a media source in the list displays a track list, which may show media available from the media source, such as a media playlist. Selecting a track from the track list may cause the media center of the target room to render the track.

A third tab in portrait orientation brings up a third view, for example, a "now playing" view, indicating media currently playing in the target room. The now playing view may show an image associated with the playing media, such as an album cover. The now playing view may also display media rendering (playback) controls 420, such as a volume control, and transport controls, such as play, pause, replay, and skip backward/forward. Other rendering controls 420 may include tone controls (bass, mid, treble) and/or balance. The user may display the current play queue 410, for example, by selecting the image or swiping downward on the now playing view display. The play queue 410 may be edited from the now play queue 410, for example, deleting media from the play queue 410 or adding media to the play queue 410.

In the landscape orientation, as shown by FIG. 14B, the display 400 presents three vertical tiles 450, 460, 470. The first tile 450 displays the first menu, the room list in the first embodiment, the second tile 460 displays the second menu, here the media source track list (playlist), and the third tile 470 displays a third menu, here the now playing queue 410. In general, the first tile 450 presents similar information to the information presented in the rooms tab of portrait orientation, and may therefore be referred to herein as the rooms tile 450. Since the rooms tile 450 occupies approximately one third of the screen area in landscape orientation as the rooms tab in the portrait orientation, the information presented in the rooms tile 450 may be reduced in comparison with the portrait orientation rooms tab, for example, by reducing the number of rooms listed. For example, the full list may be displayed by scrolling the displayed portion of the list.

In general, the second tile 460 presents similar information to the information presented in the music tab of portrait orientation, and may therefore be referred to herein as the music tile 460. Since the music tile 460 occupies approximately one third of the screen area in landscape orientation as the music tab in the portrait orientation, the information presented in the music tile 460 may be reduced in comparison with the portrait orientation music tab, for example, by reducing the number of sources listed. Like the music tab, the music tile 460 may be switched, for example by swiping the screen or selecting a media source, between a top level menu displaying a list of music sources, and a track level browsing view, displaying a list of tracks in the playlist of the selected media source.

In general, the third tile 470 presents similar information to the information presented in the now playing tab of portrait orientation, and may therefore be referred to herein as the now playing tile 470. Since the now playing tile 470 occupies approximately one third or less of the screen area in landscape orientation as the now playing tab in the portrait orientation, the information presented in the now playing tile 470 may be reduced in comparison with the portrait orientation now playing tab, for example, by reducing the number of sources listed. Like the now playing tab, the now playing tile 460 may be switched, for example by swiping or selecting a track, between a top level menu displaying information of the track corresponding to the media currently being rendered, to a play queue 410, displaying an ordered list of tracks in the play queue 410 for rendering. Each of the first tile 450, second tile 460, and the third tile 470 may be scrollable, to facilitate display of lists longer than may be feasible to be shown in their entirety in the available space.

Unlike the first tile 450 and second tile 460, the third tile 470 may not extend fully from the bottom of the screen to the system bar 402. Instead, the top portion of the third tile 470 may be displaced somewhat by a sub-menu, here a tool pallet 480. The tool pallet 480 may display one or more objects to assist the user in manipulating one or more of the tiles 450, 460, 470. For example, the tool pallet 480 may include an edit icon 481, a delete icon 482, and a save icon 483, among other icons. The edit icon 481 allows the user to mark and reorder one or more items. The delete icon 482 allows the user to clear only the marked items or delete the whole list at once (without having to mark many items). The form of an icon in the tool pallet 480 may change according to a context of the action. For example, the appearance of the edit icon 481 may change from a pencil to a check mark to allow the user to save edits that have been made.

The delete icon 482 may be used to remove an item from one of the tiles, for example, by dragging an object over the delete icon 482. The save icon 483 may act as a "Save as a Playlist" button that lets the user save the contents of a list into a playlist for later recall. This saves the user from having to manually recreate the order of songs currently in the list. In alternative embodiments, the tool pallet 480 may be in the first tile 450 or second tile 460, or may be available as a pop-up menu. The tiles 450, 460, 470 may also contain other sub-menus.

In the first embodiment, the tiles 450, 460, 470 may be arranged to be hierarchical, where the first tile 450 represents a high level of objects, the second tile 460 represents a middle level of objects, and the third tile 470 represents a low level of objects, such that the high level objects may be considered to include the middle level objects, and the middle level object may be considered to include the low level objects. For example, a media player in a room may be represented by an object in the first tile 4250, and be considered to include a playlist represented by an object in the second tile 460. While it may be desirable in some embodiments to arrange the tiles in a hierarchical fashion, alternative embodiments may adopt different arrangements.

Figure 15A:
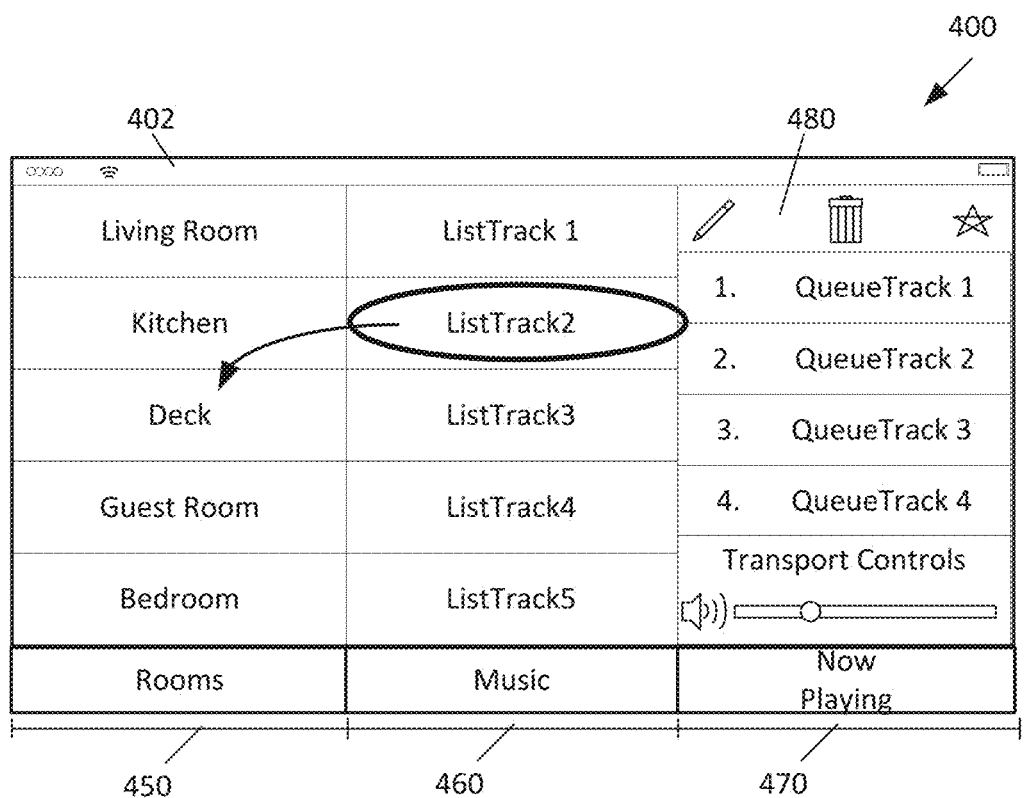
FIG. 15A is a schematic diagram of a screen of the first embodiment of the controller in landscape orientation demonstrating a first drag-and-drop operation.

In contrast to portrait mode, where the content of only one menu is presented at a time, in landscape mode the user may drag-and-drop objects from one menu to another by dragging an object from one tile to another. For example, as shown in FIG. 15A a track from a playlist on the music tile 460 may be dragged to a room in the room tile 450, which corresponds to a room 101-105 (FIG. 13) in the house 100 (FIG. 13), the deck in this case, and in particular, to a media rendering device or group 111-115 (FIG. 13) located in the corresponding room 101-105 (FIG. 13). Depending upon how the media rendering device 111-115 (FIG. 13) in the selected room 101-105 (FIG. 13) is configured, the dragged track may be added to the play queue of the media rendering device 111-115 (FIG. 13), for example, at a head or a tail of the play queue. Furthermore, the now playing tile 470 may be updated to display the play queue 410 of the selected media rendering device 111-115 (FIG. 13), with the play queue 410 in the now playing tile 470 updated to include the dragged track.

Figure 15B:
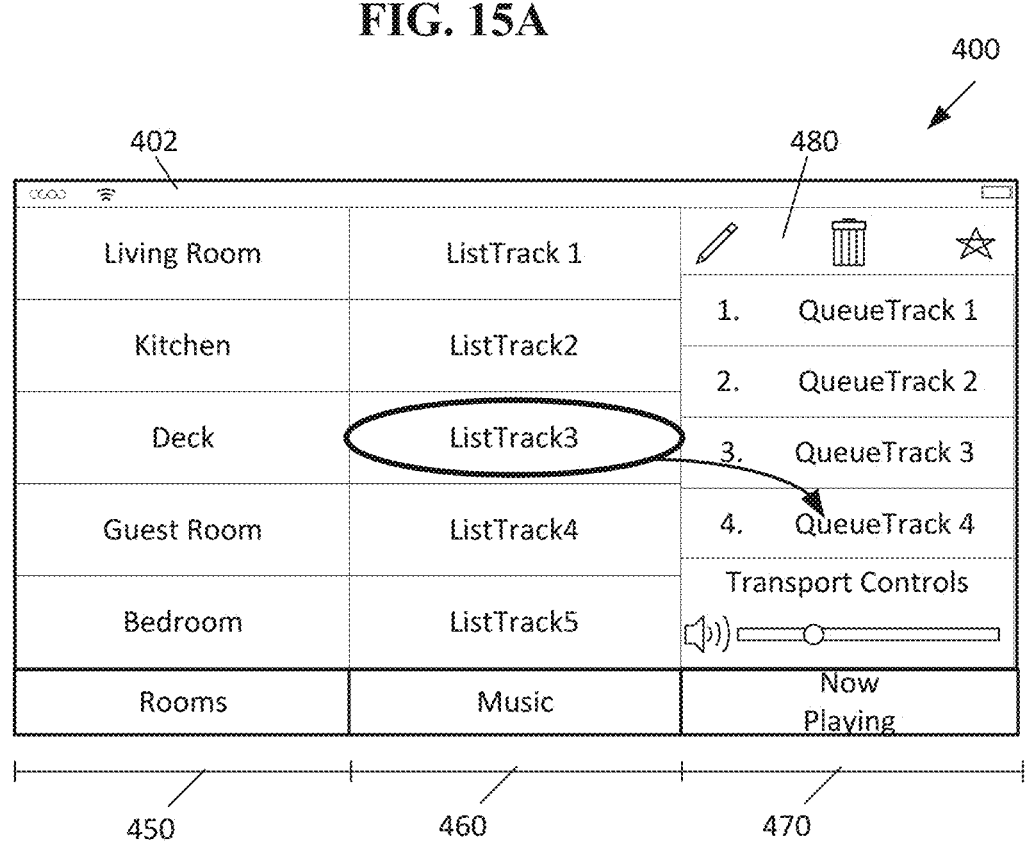
FIG. 15B is a schematic diagram of a screen of the first embodiment of the controller in landscape orientation demonstrating a second drag-and-drop operation.
Figure 15C:
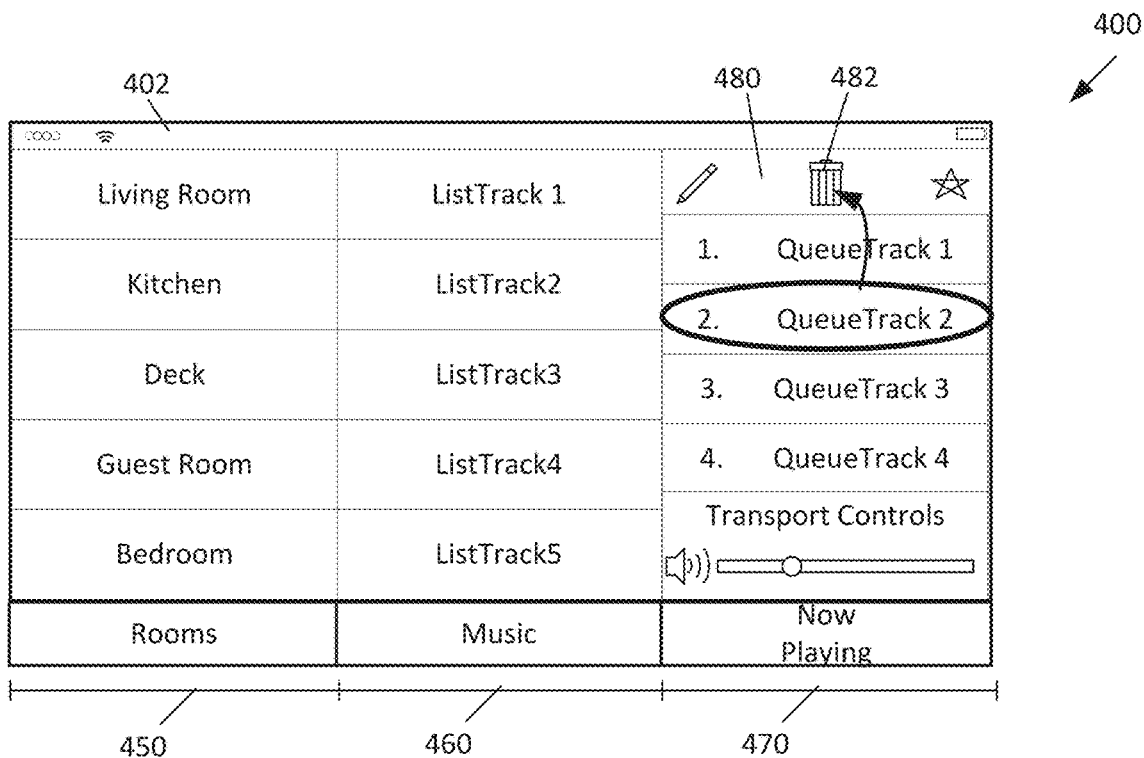
FIG. 15C is a schematic diagram of a screen of the first embodiment of the controller in landscape orientation demonstrating a third drag-and-drop operation.
Figure 15D:
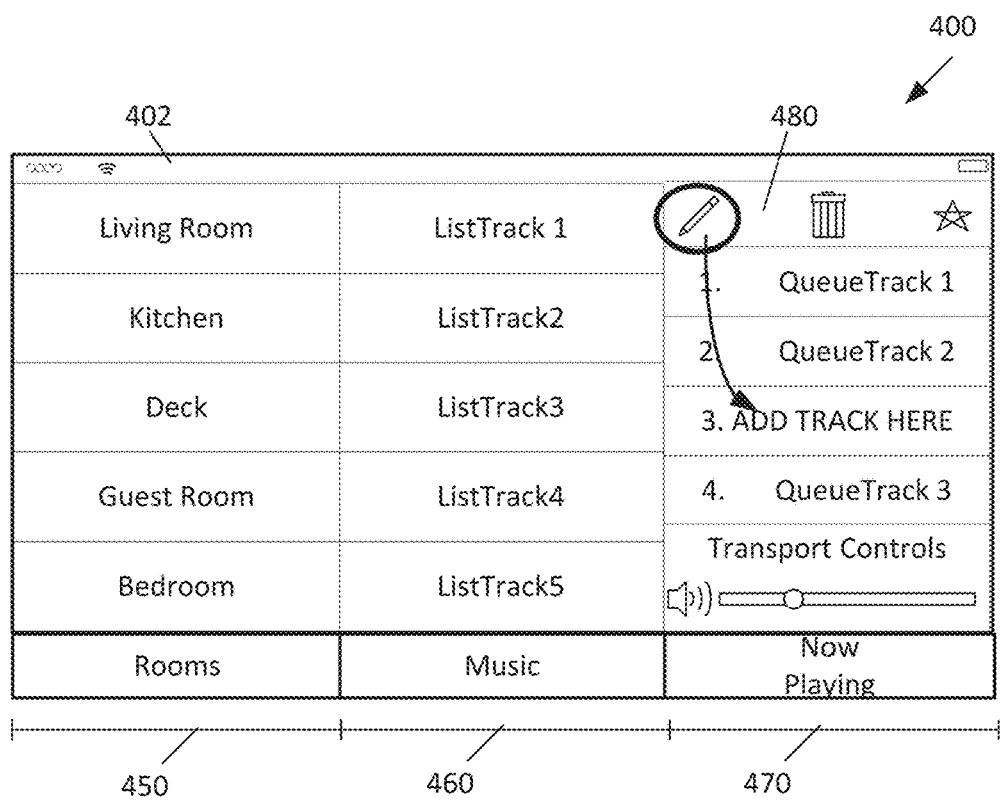
FIG. 15D is a schematic diagram of a screen of the first embodiment of the controller in landscape orientation demonstrating a fourth drag-and-drop operation.

In another example, as shown in FIG. 15B a track from a playlist on the music tile 460 may be dragged to a desired position in the play queue 410 in the now playing tile 470. As a result, the user effectively edits the play queue 410. Other implementations are also possible. For example, as shown in FIG. 15C, the user may delete a track from the play queue 410 by dragging and dropping the track over the delete icon 482 on the tool pallet 480. As shown in FIG. 15D, the edit icon 481 may be dragged over a location in one of the tiles 450, 460, 470, in this case, the play queue 410 in the now playing tile 470, causing an object to be inserted into the play queue 410 at the designated location. The user may then populate the drawn in object by a subsequent action, for example, clicking on the drawn in object to bring up a selector window.

As with the music tab in portrait mode, the music tile 460 may be switched between a top level menu and one or more lower level menus, for example, by selecting a media source in the top level menu, which will then populate the music tile 460 with the playlist for the media source.

Other drag-and-drop actions are also possible. For example, the play queue 410 in the now playing tile 470 may be dragged to a room in the room tile 450, causing the media rendering device 111-115 (FIG. 13) in the target room 101-105 (FIG. 13) to render media from the dragged play queue 410. As shown by these examples, the landscape mode facilitates simple and intuitive interaction between objects in different tiles 450, 460, 470, providing a more powerful control interface than that provided in portrait mode alone.

Figure 16A:
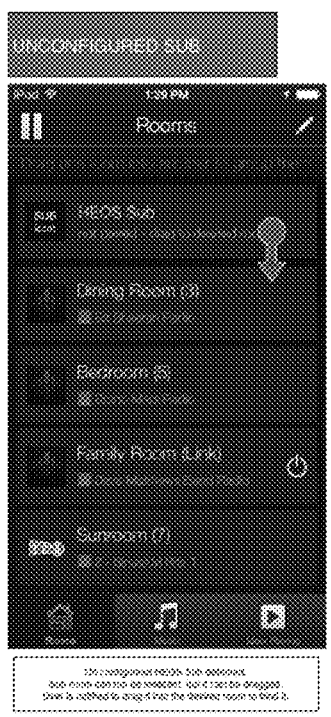
FIG. 16A-C are schematic diagrams of a screen with a room tile depicting an unconfigured subwoofer (FIG. 16A) appearing in the room tile, a drag-and-drop operation in which the subwoofer is dragged into a room (FIG. 16B), resulting in joining of the subwoofer with the media rendering device within the room (FIG. 16C).
Figure 16B:
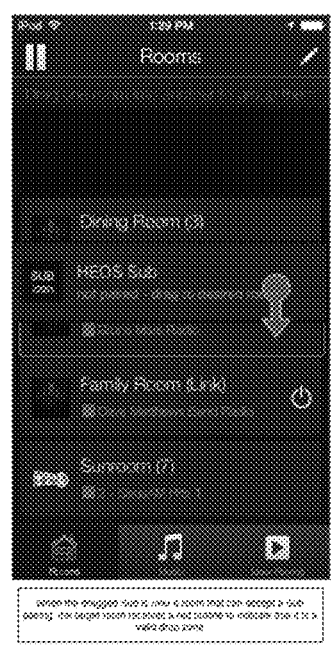
Figure 16C:

Still further, configuration and joining of the subwoofer 223 (FIG. 9) with one or more media rendering devices 221, 222 (FIG. 9) can be accomplished using the drag-and-drop actions as described above. For example, once one or more subwoofers 223 (FIG. 9) have been discovered by the network and controller (e.g., after the network connection has been established between the subwoofer 223 (FIG. 9) and the first and/or second media rendering devices 221, 222 (FIG. 9) as described above), the one or more subwoofer 223 (FIG. 9) appears on the controller. This is shown, for example, in FIGS. 16A-C. As shown in FIG. 16A, a graphical object "HEOS Sub" 402 appears as an item in the room tile 450. A user may then join the subwoofer 223 with one or more media rendering devices located in one or more of the rooms listed in the room tile 450 by dragging the HEOS sub 402 into one or more of the rooms in the room tile 450.

Once the HEOS sub 402 has been dragged into one of the rooms, the subwoofer 223 is joined with the media rendering device in that room. At this point, HEOS sub 402 no longer appears in the room tile 450, and the subwoofer 223 is controllable by controlling the media rendering device to which the subwoofer 223 is joined, as is conventional. In particular, the subwoofer 223 will typically have a default setting, in which the subwoofer has an output that is a volume relative to that of the controllable media rendering device. As such, controlling the volume of the media rendering device will provide an automatic output of the joined subwoofer.

In the event that a user wishes to select a custom setting for the subwoofer 223, the user may access the controller settings for the media rendering device to which the subwoofer is joined, and/or to a configuration page on the controller 224 specific to the subwoofer 223. For example, the subwoofer 223 may be configured via a setting page specific to the subwoofer 223 if the subwoofer 223 is discovered on the by the controller 224 and has not joined a group 220, or if the subwoofer 223 is discovered before a group 220 has been configured. When the controller settings for the media rendering device are accessed, the subwoofer settings relative to the joined device are depicted and can be modified as desired. Likewise, in the event that a user wishes to disconnect the subwoofer 223 from the designated media rendering device and join the subwoofer to another media rendering device, the settings for the media rendering device are accessed, which will depict sub 402 within the settings. Sub 402 can then be dragged out of the media rendering device settings to unjoin the subwoofer.

The device settings for the subwoofer 223 may include, for example, a relative volume level with respect to one or more speakers in the group 220, an enable/disable selector, a crossover frequency selector (may be referred to as a low pass filter), and an enable selector for the filter. The filter/crossover frequency may be entered by the user, or be selected from a list of option, for example, a list of frequencies ranging from 80 Hz to 300 Hz. A phase selector, for example, may be used to reverse the polarity of the audio channel rendered by the subwoofer 223.

While the embodiments above have described a landscape mode with three side-by-side tiles, in alternative embodiments the landscape mode may include two, four or more side-by-side tiles.

System

Figure 12:
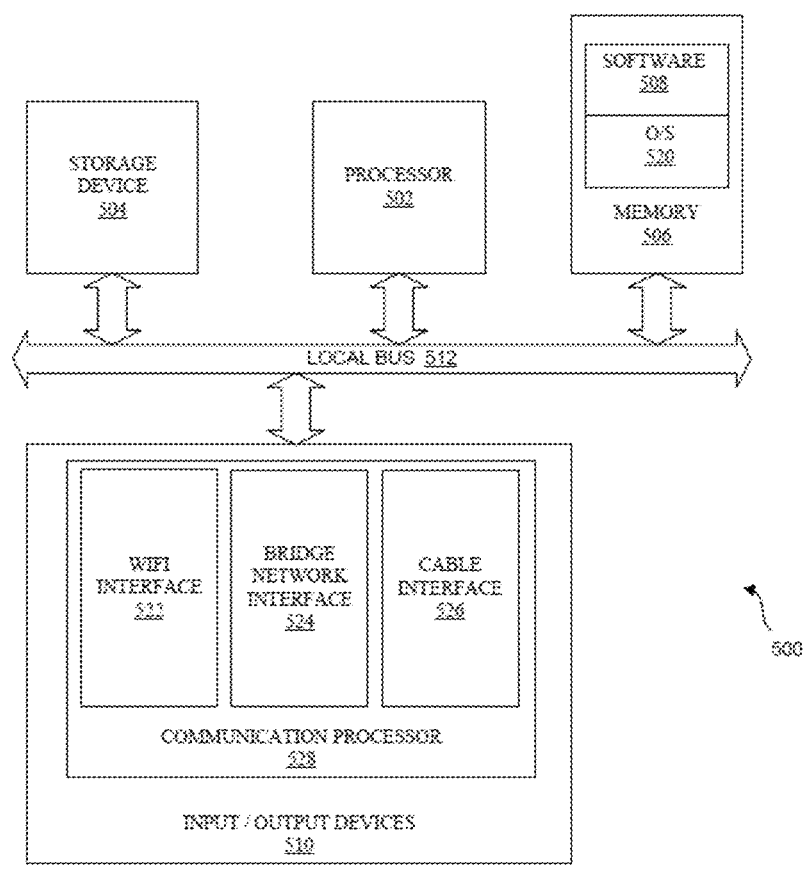
FIG. 12 is a schematic diagram illustrating an example of a system for executing functionality of the present invention.

As previously mentioned, the present system for executing the functionality of the players 221, 222 and subwoofer 223 (FIGS. 2-10) described in detail above may be a computer, an example of which is shown in the schematic diagram of FIG. 12. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. The I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

The I/O devices 510 include a communication processor 528. The communication processor may control and/or include a Wi-Fi interface 522, for example, but not limited to an interface configured to an IEEE 802.11bgn network interface, among other possible wireless network interfaces. A bridge network interface 524 is configured to provide wireless communication independently of the Wi-Fi interface 522, as described above. A cable interface 526 provides a hard-wired communications interface, for example, between the players 221, 222 and the controller application.

When the system 500 is in operation, the processor 502 is configured to execute the software 508 stored within the memory 506 to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for controlling a plurality of media rendering devices in a data network with a controller device comprising a processor and a memory configured to store non-transitory instructions for execution by the processor, the plurality of media rendering devices being within a wireless communication network, comprising the steps of:
    adding an audio rendering device to the data network such that the audio rendering device is visible on the network to the controller;
    via a user interface on the controller, displaying an audio rendering device graphical object representing the audio rendering device within a room tile graphical object comprising a plurality of room graphical objects, each room graphical object representing a location of a group comprising one or more of the plurality of rendering devices configured to render a media program comprising one or more audio channels;

receiving a selection of the audio rendering device and a room graphical object of the plurality of room graphical objects by a user of the controller;

as a result of receiving the selection, generating a configuration command to the audio rendering device in the selected room, joining the audio rendering device with the room graphical object group;

assigning a first audio channel associated with the group to the audio rendering device; and hiding the audio rendering device graphical object from the room tile graphical object, wherein selection by the user further comprises a drag and drop of the audio rendering device graphical object upon the room graphical object.

2. The method of claim 1, wherein the audio rendering device comprises a subwoofer.

3. The method of claim 2, wherein the first audio channel further comprises a frequency bandlimited version of one or more of a second audio channel associated with the group and a third audio channel associated with the group.

4. The method of claim 2, wherein the first audio channel is selected from the one or more audio channels.

5. The method of claim 1, wherein assigning an audio channel is performed one of a group consisting of the controller and a group leader of the one or more of the plurality of rendering devices.

6. The method of claim 1, wherein the controller device comprises a touch screen user interface.

7. The method of claim 6, wherein the user interface is configured to present a display portion of the touch screen in a portrait or landscape mode comprising a first full screen presenting at least one tile, the at least one tile displaying the room tile graphical object.

8. The method of claim 1, wherein the user interface of the controller further comprises a touch screen, the audio rendering device comprises a wireless subwoofer, and the method further comprising the steps of:

providing a graphical user interface (GUI) on a display portion of the touch screen;

presenting the display portion of the touch screen in a portrait or landscape mode comprising a first full screen presenting at least one tile, the at least one tile displaying the room tile graphical object;

detecting the presence of the wireless subwoofer in the network; and receiving configuration information via the GUI regarding the wireless subwoofer.

9. A controller for a plurality of media rendering devices within a wireless communication network comprising:

a user interface; and a processor and a memory containing non-transitory instructions that, when executed by the processor, perform the steps of:

adding an audio rendering device to the data network such that the audio rendering device is visible on the network to the controller;

via the user interface on the controller, displaying an audio rendering device graphical object representing the audio rendering device within a room tile graphical object comprising a plurality of room graphical objects, each room graphical object representing a location of a group comprising one or more of the plurality of rendering devices configured to render a media program comprising one or more audio channels;

receiving a selection of the audio rendering device and a room graphical object of the plurality of room graphical objects by a user of the controller;

as a result of receiving the selection, generating a configuration command to the audio rendering device in the selected room, joining the audio rendering device with the room graphical object group;

assigning a first audio channel associated with the group to the audio rendering device; and hiding the audio rendering device graphical object from the room tile graphical object, wherein selection by the user further comprises a drag and drop of the audio rendering device graphical object upon the room graphical object.

10. The controller of claim 9, wherein the user interface of the controller further comprises a touch screen, the audio rendering device comprises a wireless subwoofer, and the processor further performs the steps of:

providing a graphical user interface (GUI) on a display portion of the touch screen;

presenting the display portion of the touch screen in a portrait or landscape mode comprising a first full screen presenting at least one tile, the at least one tile displaying a list of a one or more rooms, each of the one or more rooms having a media rendering device therein;

detecting the presence of the wireless subwoofer in the network;

receiving configuration information via the GUI regarding the wireless subwoofer.

11. A system operating in a wireless communication network, comprising:

a controller device in communication with the network comprising:

a user interface; and a processor and a memory containing non-transitory instructions that, when executed by the processor, perform the steps of:

adding an audio rendering device to the data network such that the audio rendering device is visible on the network to the controller;

via the user interface on the controller, displaying an audio rendering device graphical object representing the audio rendering device within a room tile graphical object comprising a plurality of room graphical objects, each room graphical object representing a location of a group comprising one or more of the plurality of rendering devices configured to render a media program comprising one or more audio channels;

receiving a selection of the audio rendering device and a room graphical object of the plurality of room graphical objects by a user of the controller;

as a result of receiving the selection, generating a configuration command to the audio rendering device in the selected room, joining the audio rendering device with the room graphical object group;

assigning a first audio channel associated with the group to the audio rendering device; and hiding the audio rendering device graphical object from the room tile graphical object, wherein selection by the user further comprises a drag and drop of the audio rendering device graphical object upon the room graphical object; and a plurality of media rendering devices in communication with the network configured to receive a configuration command from the controller device and adjust an operating parameter according to the configuration command.

12. The system of claim 11, wherein the user interface of the controller further comprises a touch screen, the audio rendering device comprises a wireless subwoofer, and the processor further performs the steps of:

providing a graphical user interface on a display portion of the touch screen; and presenting the display portion of the touch screen in a portrait or landscape mode comprising a first full screen presenting at least one tile, the at least one tile displaying a list of a plurality of rooms, each of the plurality of rooms having a media rendering device therein.

* * * * *